(12) United States Patent
Petro et al.

(10) Patent No.: US 6,347,327 B1
(45) Date of Patent: Feb. 12, 2002

(54) METHOD AND APPARATUS FOR N-NARY INCREMENTOR

(75) Inventors: Anthony M. Petro; James S. Blomgren, both of Austin, TX (US)

(73) Assignee: Intrinsity, Inc., Austin, TX (US)

( * ) Notice: Subject to any disclaimer, the term of this patent is extended or adjusted under 35 U.S.C. 154(b) by 0 days.

(21) Appl. No.: 09/206,830

(22) Filed: Dec. 7, 1998

Related U.S. Application Data

(60) Provisional application No. 60/069,250, filed on Dec. 11, 1997.

(51) Int. Cl.[7] .............................. G06F 7/00; G06F 7/50
(52) U.S. Cl. ........................................ 708/672; 708/493
(58) Field of Search ................... 708/672, 700, 708/702, 704, 706, 710, 711, 712, 714, 493

(56) References Cited

U.S. PATENT DOCUMENTS

| | | | | |
|---|---|---|---|---|
| 5,198,993 A | * | 3/1993 | Makakura | 708/714 |
| 5,208,490 A | * | 5/1993 | Yetter | 326/98 |
| 5,719,803 A | * | 2/1998 | Naffziger | 708/710 |

* cited by examiner

*Primary Examiner*—Ohuong Dinh Ngo
(74) *Attorney, Agent, or Firm*—Booth & Wright, L.L.P.; Matthew J. Booth; Karen S. Wright

(57) ABSTRACT

The present invention is an incrementor that receives as inputs a 32-dit 1-of-4 operand and a 1-of-2 increment control signal. For each dit of the operand, the present invention determines whether the increment control signal, which is treated as a carry into the least significant dit, propagates into said dit. If so, the value of the dit is incremented. Otherwise, the dit value is output without modification. The present invention also generates a carry out signal if the increment control signal has propagated across all dits.

6 Claims, 15 Drawing Sheets

METHOD AND APPARATUS FOR N-NARY INCREMENTOR

This application claims the benefits of the earlier filed U.S. Provisional Application Serial No. 60/069,250, filed Dec. 11, 1997, which is incorporated by reference for all purposes into this application.

BACKGROUND OF THE INVENTION

1. Field of the Invention

The present invention relates to digital computing, and more particularly to an apparatus and method for an incrementor.

2. Description of the Related Art

An often-useful degenerate form of an adder is the incrementor, which adds a value of "1" (usually conditionally) to a numeric operand. Incrementors are particularly useful in some address generation situations where sequential addresses must be generated efficiently. Because the incrementor only has one true operand, it is simpler in structure than a full adder, and a 32-bit incrementor can be built in only two logic levels, in contrast to a full adder. (An example of an adder utilizing three logic levels is set forth in co-pending application, U.S. Pat. Ser. No. 09/206,463 entitled "Method and Apparatus for 3-stage 32-bit Adder/Subtractor," now U.S. Pat. No. 6,269,387, hereinafter referred to as "the 3-stage Adder Application.")

Traditional Binary Addition

In most computer systems, addition and subtraction of numbers is supported. In systems using traditional binary logic, the truth table for one-bit addition is set forth in Table 1.

TABLE 1

| A | B | A + B |
|---|---|-------|
| 0 | 0 | 0 |
| 0 | 1 | 1 |
| 1 | 0 | 1 |
| 1 | 1 | 0* |

In the last row of Table 1, a carry condition occurs. That is, the result is 0, but a carry into the next-higher-order bit position, corresponding to a decimal value of 2, has conceptually occurred.

In addition to single bits, the addition operation may be performed on multiple bits, including addition of two two-bit values. The truth table for such an operation is set forth in Table 2, where the first operand A is a two-bit value comprising bits $A_0$ and $A_1$. The second operand, B, is a two-bit value comprising bits $B_0$ and $B_1$.

TABLE 2

| $A_1$ | $A_0$ | $B_1$ | $B_0$ | A = Decimal Value | B = Decimal Value | A + B | A + B = Dec. Value |
|---|---|---|---|---|---|---|---|
| 0 | 0 | 0 | 0 | 0 | 0 | 00 | 0 |
| 0 | 0 | 0 | 1 | 0 | 1 | 01 | 1 |
| 0 | 0 | 1 | 0 | 0 | 2 | 10 | 2 |
| 0 | 0 | 1 | 1 | 0 | 3 | 11 | 3 |
| 0 | 1 | 0 | 0 | 1 | 0 | 01 | 1 |
| 0 | 1 | 0 | 1 | 1 | 1 | 10 | 2 |
| 0 | 1 | 1 | 0 | 1 | 2 | 11 | 3 |
| 0 | 1 | 1 | 1 | 1 | 3 | 00* | 0 |
| 1 | 0 | 0 | 0 | 2 | 0 | 10 | 2 |
| 1 | 0 | 0 | 1 | 2 | 1 | 11 | 3 |
| 1 | 0 | 1 | 0 | 2 | 2 | 00* | 0 |
| 1 | 0 | 1 | 1 | 2 | 3 | 01* | 1 |
| 1 | 1 | 0 | 0 | 3 | 0 | 11 | 3 |
| 1 | 1 | 0 | 1 | 3 | 1 | 00* | 0 |
| 1 | 1 | 1 | 0 | 3 | 2 | 01* | 1 |
| 1 | 1 | 1 | 1 | 3 | 3 | 10* | 2 |

Each output value in the "A+B" column of Table 2 indicated with an asterisk denotes a carry condition where a one has conceptually carried into the next-higher-order bit (the bit position corresponding to a decimal value of four).

N-nary Logic

The present invention utilizes N-nary logic. The N-nary logic family supports a variety of signal encodings, including 1-of-4. The N-nary logic family is described in a copending patent application, U.S. patent application Ser. No. 09/019,355, filed Feb. 5, 1998, now U.S. Pat. No. 6,066,965, and titled "Method and Apparatus for a N-Nary logic Circuit Using 1-of-4 Signals", which is incorporated herein for all purposes and hereinafter referred to as "The N-nary Patent." In 1-of-4 encoding, four wires are used to indicate one of four possible values. In contrast, traditional static design uses two wires to indicate four values, as is demonstrated in Table 2. In Table 2, the $A_0$ and $A_1$ wires are used to indicate the four possible values for operand A: 00, 01, 10, and 11. The two B wires are similarly used to indicate the same four possible values for operand B. "Traditional" dual-rail dynamic logic also uses four wires to represent two bits, but the dual-rail scheme always requires two wires to be asserted. In contrast, N-nary logic only requires assertion of one wire. The benefits of N-nary logic over dual-rail logic, such as reduced power and reduced noise, should be apparent from a reading of The N-nary Patent.

All signals in N-nary logic, including 1-of-4, are of the 1-of-N form where N is any integer greater than one. A 1-of-4 signal requires four wires to encode four values (0–3 inclusive), or the equivalent of two bits of information. More than one wire will never be asserted for a 1-of-N signal. Similarly, N-nary logic requires that a high voltage be asserted for all values, even 0.

Any one N-nary gate may comprise multiple inputs and/or outputs. In such a case, a variety of different N-nary encodings may be employed. For instance, consider a gate that comprises two inputs and two outputs, where the inputs are a 1-of-4 signal and a 1-of-2 signal and the outputs comprise a 1-of-4 signal and a 1-of-3 signal. Various variables, including P, Q, R, and S, may be used to describe the encoding for these inputs and outputs. One may say that one input comprises 1-of-P encoding and the other comprises 1-of-Q encoding, wherein P equals two and Q equals four. Similarly, the variables R and S may be used to describe the outputs. One might say that one output comprises 1-of-R encoding and the other output comprises 1-of-S encoding, wherein R equals four and S equals 3. Through the use of these, and other, additional variables, it is possible to describe multiple N-nary signals that comprise a variety of different encodings.

SUMMARY OF THE INVENTION

The preferred embodiment of the present invention comprises a two-stage 32-bit incrementor that receives as inputs a 32-bit 1-of-4 operand to be incremented and a 1-of-2 increment control select signal. In the first level of logic, the value of each dit of the operand is both stored in a buffer and is also incremented. Also in the first level, an HPG carry propagate signal is also generated for each block of four dits. Both the buffered value and the incremented value for each dit are passed to the second level of logic, along with the block HPG signals. In the second level of logic, the block HPG signals are used to determine whether the original buffered value or the incremented value of each dit should be output from the incrementor. The preferred embodiment of the incrementor also produces, in addition to an incremented 1-of-4 32-dit output operand, a 1-of-2 carry out indicator.

DETAILED DESCRIPTION OF THE INVENTION

The present invention relates to a two-logic-level incrementor using N-nary logic. This disclosure describes numerous specific details that include specific formats, structures, circuits, and logic functions in order to provide a thorough understanding of the present invention. One skilled in the art will appreciate that one may practice the present invention without these specific details. Additionally, this disclosure does not describe in detail some well-known structures such as N-FETs, P-FETs, nor does it describe N-nary logic in detail, in order not to obscure the present invention.

For illustrative purposes, a truth table demonstrating the add operation using 1-of-4 encoding is set forth in Table 3. Each of the inputs A and B in Table 3 is a two-bit input that can represent one of four values, 0 through 3 inclusive, depending on which of the four wires for each signal is set high. Table 3 discards any potential input value that includes more than one wire asserted for each 1-of-4 signal, such as 1111 and 0101. Such values are undefined for the evaluate stage of 1-of-4 logic gates. The four wires for the two-bit sum of the 1-of-4 addition operation in Table 3 are labeled $S_3$, $S_2$, $S_1$, and $S_0$.

TABLE 3

| $A_3$ | $A_2$ | $A_1$ | $A_0$ | A Dec. Value | $B_3$ | $B_2$ | $B_1$ | $B_0$ | B Dec. Value | $S_3$ | $S_2$ | $S_1$ | $S_0$ | Output Decimal Value |
|---|---|---|---|---|---|---|---|---|---|---|---|---|---|---|
| 0 | 0 | 0 | 1 | 0 | 0 | 0 | 0 | 1 | 0 | 0 | 0 | 0 | 1 | 0 |
| 0 | 0 | 0 | 1 | 0 | 0 | 0 | 1 | 0 | 1 | 0 | 0 | 1 | 0 | 1 |
| 0 | 0 | 0 | 1 | 0 | 0 | 1 | 0 | 0 | 2 | 0 | 1 | 0 | 0 | 2 |
| 0 | 0 | 0 | 1 | 0 | 1 | 0 | 0 | 0 | 3 | 1 | 0 | 0 | 0 | 3 |
| 0 | 0 | 1 | 0 | 1 | 0 | 0 | 0 | 1 | 0 | 0 | 0 | 1 | 0 | 1 |
| 0 | 0 | 1 | 0 | 1 | 0 | 0 | 1 | 0 | 1 | 0 | 1 | 0 | 0 | 2 |
| 0 | 0 | 1 | 0 | 1 | 0 | 1 | 0 | 0 | 2 | 1 | 0 | 0 | 0 | 3 |
| 0 | 0 | 1 | 0 | 1 | 1 | 0 | 0 | 0 | 3 | 0 | 0 | 0 | 1 | 0* |
| 0 | 1 | 0 | 0 | 2 | 0 | 0 | 0 | 1 | 0 | 0 | 1 | 0 | 0 | 2 |
| 0 | 1 | 0 | 0 | 2 | 0 | 0 | 1 | 0 | 1 | 1 | 0 | 0 | 0 | 3 |
| 0 | 1 | 0 | 0 | 2 | 0 | 1 | 0 | 0 | 2 | 0 | 0 | 0 | 1 | 0* |
| 0 | 1 | 0 | 0 | 2 | 1 | 0 | 0 | 0 | 3 | 0 | 0 | 1 | 0 | 1* |

TABLE 3-continued

| $A_3$ | $A_2$ | $A_1$ | $A_0$ | A Dec. Value | $B_3$ | $B_2$ | $B_1$ | $B_0$ | B Dec. Value | $S_3$ | $S_2$ | $S_1$ | $S_0$ | Output Decimal Value |
|---|---|---|---|---|---|---|---|---|---|---|---|---|---|---|
| 1 | 0 | 0 | 0 | 3 | 0 | 0 | 0 | 1 | 0 | 1 | 0 | 0 | 0 | 3 |
| 1 | 0 | 0 | 0 | 3 | 0 | 0 | 1 | 0 | 1 | 0 | 0 | 0 | 1 | 0* |
| 1 | 0 | 0 | 0 | 3 | 0 | 1 | 0 | 0 | 2 | 0 | 0 | 1 | 0 | 1* |
| 1 | 0 | 0 | 0 | 3 | 1 | 0 | 0 | 0 | 3 | 0 | 1 | 0 | 0 | 2* |

In Table 3, output values with asterisks indicate that a carry is conceptually generated into a higher-order bit representing a decimal value of 4.

Figure 8:
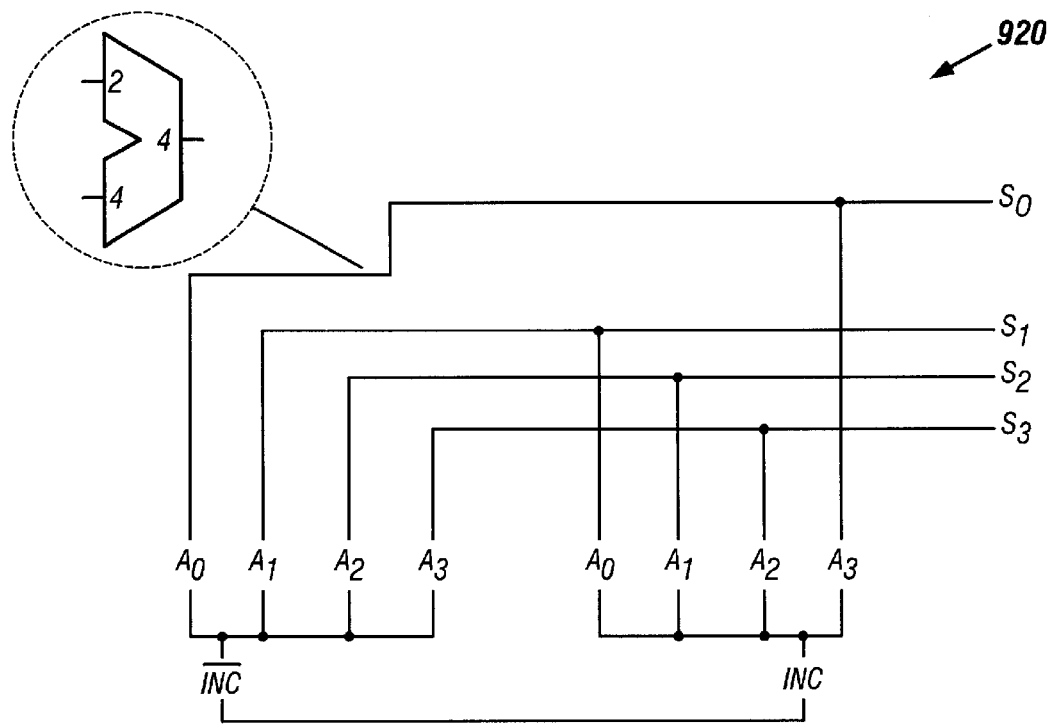
FIG. 8 is a shorthand representation of an N-nary LSBlk incrementor.

The incrementor function of the present invention is a degenerate form of adder that only adds one to its addend input. An incrementor gate is illustrated in FIG. 8. The gate 920 of FIG. 8 adds one to its addend, A, to produce its output, S, when the increment control signal, inc, is asserted. The output of the incrementor gate 920 illustrated in FIG. 8 conforms to Table 3A.

TABLE 3A

| $A_3$ | $A_2$ | $A_1$ | $A_0$ | A Dec. Value | inc | $\overline{inc}$ | $S_3$ | $S_2$ | $S_1$ | $S_0$ | Output Decimal Value |
|---|---|---|---|---|---|---|---|---|---|---|---|
| 0 | 0 | 0 | 1 | 0 | 0 | 1 | 0 | 0 | 0 | 1 | 0 |
| 0 | 0 | 0 | 1 | 0 | 1 | 0 | 0 | 0 | 1 | 0 | 1 |
| 0 | 0 | 1 | 0 | 1 | 0 | 1 | 0 | 0 | 1 | 0 | 1 |
| 0 | 0 | 1 | 0 | 1 | 1 | 0 | 0 | 1 | 0 | 0 | 2 |
| 0 | 1 | 0 | 0 | 2 | 0 | 1 | 0 | 1 | 0 | 0 | 2 |
| 0 | 1 | 0 | 0 | 2 | 1 | 0 | 1 | 0 | 0 | 0 | 3 |
| 1 | 0 | 0 | 0 | 3 | 0 | 1 | 1 | 0 | 0 | 0 | 3 |
| 1 | 0 | 0 | 0 | 3 | 1 | 0 | 0 | 0 | 0 | 1 | 0* |

N-nary Logic Circuits

Figure 1:
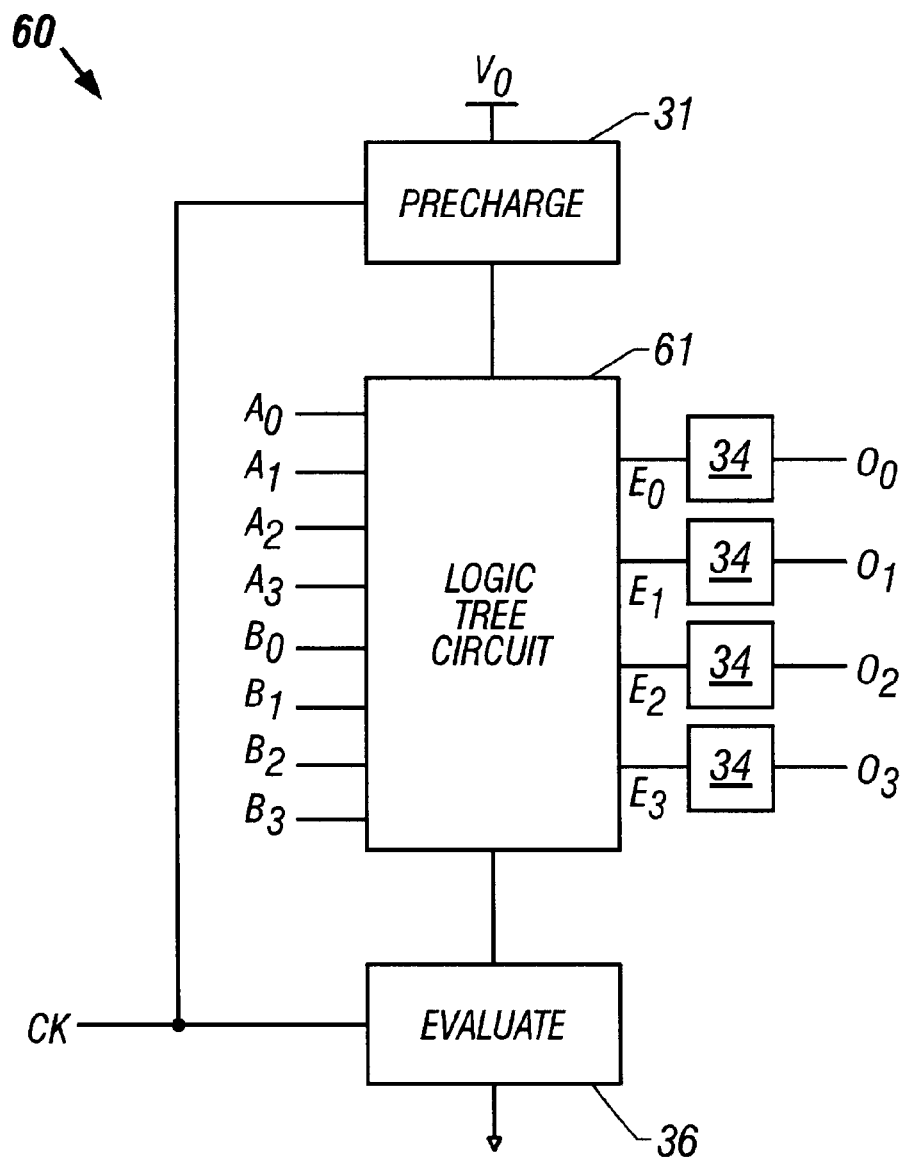
FIG. 1 is a block diagram of an N-nary gate.

A background discussion of N-nary circuits is in order before discussing the incrementor of the present invention. N-nary logic may be used to create circuits to perform a desired function. The present invention utilizes N-nary logic. FIG. 1 illustrates a 1-of-N logic gate 60 that uses two sets of 1-of-N signals for the inputs and produces one 1-of-N signal for the output. In gate 60, the A and B inputs comprise four wires each, with each set of wires representing 2 bits (one dit) of data. A is a one-dit input, B is a one-dit input, and O is a one-dit output. In other words, the N-nary gate 60 depicted in FIG. 1 comprises 4 input bits (2 dits) and 2 output bits (one dit).

Figure 2:
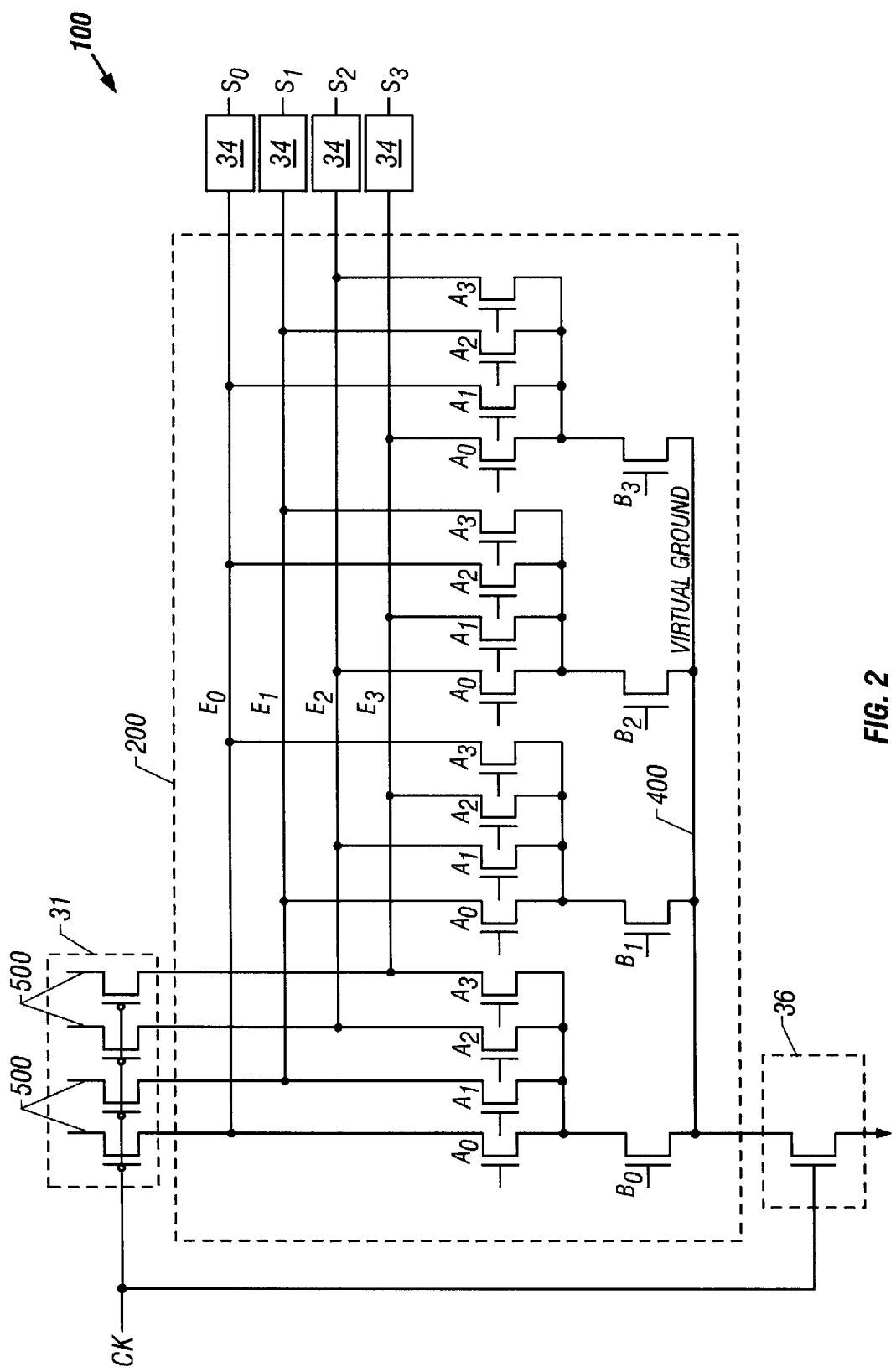
FIG. 2 is an illustration of an N-nary adder gate.

Referring to FIG. 1, each N-nary dit logic circuit 60 comprises a logic tree circuit 61, a precharge circuit 31, and an evaluate circuit 36. The logic tree circuit 61 performs a logic function on the two 1-of-4 input signals that could comprise a variety of functions, for example, the Boolean logic functions AND/NAND and OR/NOR, or the more complex carry-lookahead function of the present invention. The logic gates of the N-nary family are clocked pre-charge (CP) gates. FIG. 2 illustrates that each input into the logic tree circuit 61 is coupled to at least one single N-channel field effect transistor (NFET) $A_0$–$A_3$, $B_0$–$B_3$. Referring back to FIG. 1, the logic tree circuit 61 therefore comprises one or more N-channel FETS. Coupled to the wires of the 1-of-4 output signal are the output buffers 34 that aid in driving additional circuits that couple to the output signal. The preferred embodiment of the present invention uses a circuit with an inverting function as the output buffer 34.

Referring again to FIG. 1, a precharge circuit 31 couples to the logic tree circuit 61 and precharges the dynamic logic of the logic tree circuit 61. The precharge circuit 31 comprises one or more FETs with the preferred embodiment of the circuit comprising P-channel FETs (PFETs). Each evaluation path of the logic tree circuit 61 has its own precharge PFET, shown as 500 in FIG. 2. The PFETs 500 of the precharge circuit 31 quickly and fully precharge all of the dynamic logic in the logic tree circuit 61 during the precharge phase of the clock cycle.

FIG. 2 is a diagram of an N-nary adder gate. FIG. 2 illustrates that the precharge PFET 500 for an evaluation node E of an N-nary circuit is connected to positive high voltage, Vcc, and is used to create conductive paths between the evaluation node E and Vcc. Each precharge PFET 500 is coupled to an input, the pre-charge signal. When the pre-charge signal for any evaluate node has a low voltage, then there is a conductive path between Vcc and the evaluation node E. Coupled to the precharge circuit 31 is the clock signal CK. A low clock signal on CK will cause the FETs in the logic tree circuit 32 to charge when using P-channel FETs in the precharge circuit 31.

An evaluate circuit 36 couples to the logic tree circuit 61 and controls the evaluation of the logic tree circuit 61. The evaluate circuit 36 comprises one or more FETs connected to the CK signal, with the preferred embodiment of the evaluate circuit comprising a single N-channel FET. The single N-FET acts as an evaluation transistor that is used to control when the gate is sensitive to inputs, and helps avoid races between other devices and excessive power consumption. During the precharge phase, the evaluate circuit 36 receives a low value so that no path to Vss may exist through the NFET(s) of the logic tree circuit 61. During the evaluate phase, the evaluate circuit 36 receives a high signal so that a path to Vss through the NFET(s) of the logic tree circuit 61 may exist. Coupled to the evaluate circuit 36 is the clock signal CK. A high clock signal on CK will cause the FETs in the logic tree circuit 61 to evaluate when using N-channel FETs in the evaluate circuit 36. In other words, when the clock signal is high, the evaluate circuit 36 evaluates the logic tree circuit 61.

Figure 3:
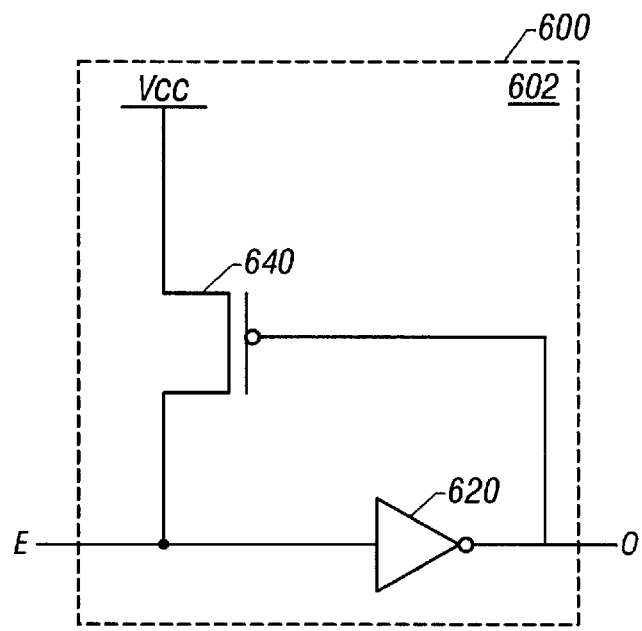
FIG. 3 is a diagram of a first embodiment of an N-nary output driver circuit.
Figure 4:
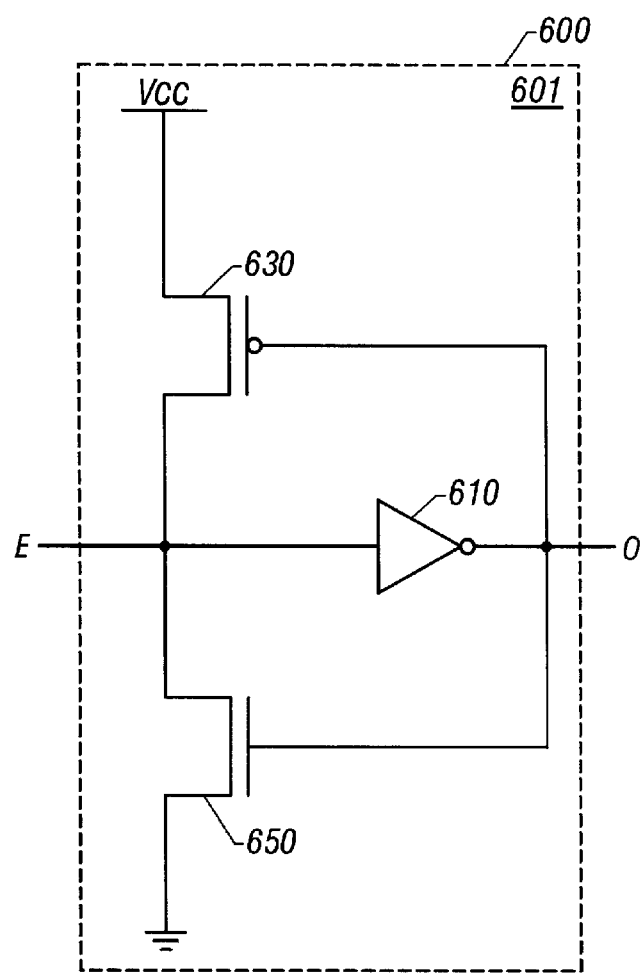
FIG. 4 is a diagram of a second embodiment of an N-nary output driver circuit.

An evaluate node, E, which comprises the four wires $E_0$, $E_1$, $E_2$, and $E_3$, is the signal pathway between the logic tree circuit 61 and an output buffer 34, and constitutes an evaluation path of the logic tree circuit 61. As stated earlier, each evaluation node wire $E_0$, $E_1$, $E_2$, and $E_3$ has its own precharge PFET. The signal on a particular wire, $E_0$, $E_1$, $E_2$, $E_3$ of the evaluate node E is high, only when there is no connection to Vss through the logic tree circuit 61 NFET(s) associated with that particular wire. If the pre-charge signal is low at time 0, and there is no path to ground through the NFET(s) associated with an evaluate node E, of the logic tree circuit 61, then the evaluate node wire E gets pulled to a high voltage. This is called the precharge phase of the gate and we may also say that the gate is in precharge mode. If the precharge signal switches to a high voltage at a later time, the evaluate node E will be floating, but the charge left on it will leave the voltage high. This is called the evaluate phase of the gate, and we may also say that the gate is in evaluate mode. If input signals generate a high voltage for any NFET(s) in the logic tree circuit 61 such that a path from the evaluate node E to ground (Vss) exists, then the charge on the evaluate node E will drain to ground, and the evaluate voltage will drop to Vss. If no such path exists, then the evaluate node E will remain at Vcc. When any gate, therefore, switches from precharge mode to evaluate mode, the evaluate node voltage is high, and it either stays high or goes low. Once the evaluate node voltage goes low during the evaluate phase, it cannot be driven high again until the next precharge phase. Each evaluate node wire $E_0$, $E_1$, $E_2$, and $E_3$ couples to an output buffer 34. Two embodiments of the output driver circuit 600 comprising output buffer 34 are illustrated in FIGS. 3 and 4. FIG. 3 illustrates a half output driver circuit 602 that comprises an inverter 620 and a PFET device 640. FIG. 4 illustrates a full output driver circuit 601 that comprises an inverter 610 coupled to a PFET device 630 and an NFET device 650. Full keeper circuits 601 are only necessary for gates that can be in neither evaluate nor precharge mode. The flow through the output driver circuit 600 is from evaluate node E to the output signal path O. The inverter 610, 620 of the output driver circuit 600 is necessary because the CP gates of the N-nary logic family precharge to a high value and evaluate to a low value. The output driver circuit 34, holds the value during an evaluate phase if the evaluate node E has not discharged. If the evaluate node E has discharged, then there is a path to ground holding its value low. The output of each evaluate node E will switch from high to low once, at most, during an evaluate phase. The output of each evaluate node E, once coupled to an output driver circuit 600 of output buffer 34, is therefore suitable for feeding a subsequent CP gate.

Figure 5:
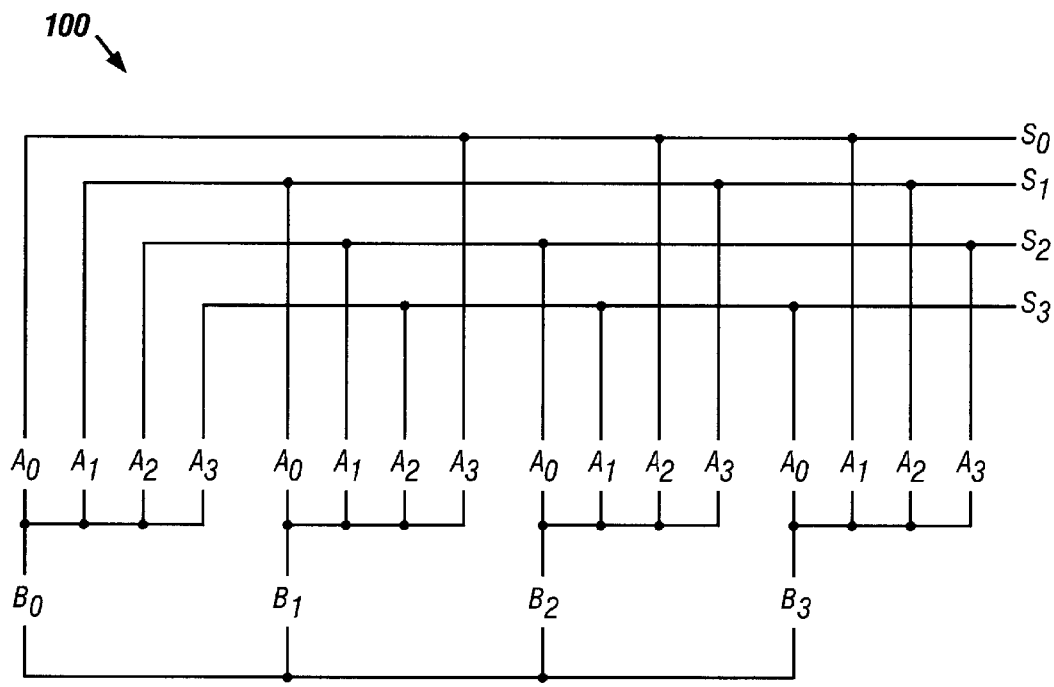
FIG. 5 is a shorthand representation of an N-nary adder gate having two 1-of-4 inputs.

A shorthand notation for circuit diagrams can be adopted to avoid needless repetition of elements common to all N-nary circuits. FIG. 2 illustrates these common elements. One common element is the pre-charge P-FET 500. Since all N-nary gates require a pre-charge P-FET 500 for each evaluate node E, the pre-charge P-FETs 500 may be implied and need not be shown. The same is true for the N-FET associated with each input wire of the A and B inputs. Similarly, each evaluate node E must have its own output buffer 34, which may be implied. The N-FET associated with the evaluate node 36 may also be implied. Since these features are common to all N-nary circuits, we may use the shorthand shown in FIG. 5 to represent the N-nary circuits. Accordingly, FIG. 5 illustrates a shorthand notation of the adder gate depicted in FIG. 2. This shorthand notation is used in FIGS. 5, 7, 7A, 8–10, 13, and 15–21. In each figure, the elements discussed herein should be implied accordingly.

Figure 6:
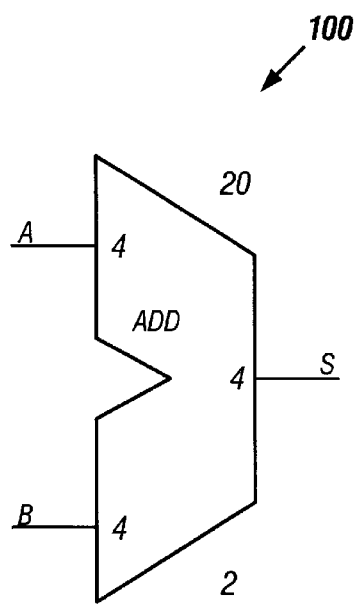
FIG. 6 is a high-level shorthand representation of an N-nary adder gate.

A further simplification to the representation of the FIG. 2 adder is shown in FIG. 6, where the inputs and outputs are shown as single signals that each can represent one of four signals and each impliedly comprises four wires. The number "4" shown within the add gate of FIG. 6, adjacent to the connections, indicates that each signal can represent one of four values. The number above the gate indicates the number of transistors in the evaluate stack, and the number below the FIG. 6 gate represents the maximum number of transistors in series between the evaluate node and virtual ground. This high-level shorthand notation is used in FIGS. 6 and 8–22. In each figure, the elements discussed herein should be implied accordingly.

Carry Propagate Logic

The preferred embodiment of the present invention, a two-stage N-nary incrementor, takes a 32-bit 1-of-4 operand and a 1-of-2 increment control signal as inputs, and produces a 32-bit 1-of-4 sum signal and a 1-of-2 carry signal as outputs. The incrementor is constructed using a subset of the carry propagate techniques described below.

In addition to the increment function, illustrated by the gate 920 in FIG. 8, the present invention requires logic to determine whether the output of the incrementor is too big to represent with 32 bits of data. In such cases, a carry out condition is present. On a gate level, a carry out condition is illustrated by the row with an asterisk in Table 3A. For an efficient incrementor, what is required is an incrementor gate that can utilize carry-propagate techniques to account for carry conditions. This is accomplished through the use of carry propagate logic, as described below.

Generally, carry propagate logic takes carry conditions into account. For any two binary numbers A and B, the sum, $S_n$, and the carry, $C_n$, for a given bit position, n, are:

$$S_n = A_n \oplus B_n \oplus C_{n-1}, \tag{1}$$

where $C_{n-1}$ is the carry in from the previous bit, n−1.

$$C_n = A_n B_n | A_n C_{n-1} | B_n C_{n-1}, \tag{2}$$

where $C_n$ is the carry out from bit n.

The truth tables for Equation 1 and Equation 2 are set forth in Table 4.

TABLE 4

| $A_n$ | $B_n$ | $C_{n-1}$ | $A_n B_n$ (1) | $A_n C_{n-1}$ (2) | $B_n C_{n-1}$ (3) | $A_n \oplus B_n$ (4) | $S_n = (4)$ $\oplus C_{n-1}$ | $C_n =$ (1)\|(2)\| (3) |
|---|---|---|---|---|---|---|---|---|
| 0 | 0 | 0 | 0 | 0 | 0 | 0 | 0 | 0 |
| 0 | 0 | 1 | 0 | 0 | 0 | 0 | 1 | 0 |
| 0 | 1 | 0 | 0 | 0 | 0 | 1 | 1 | 0 |
| 0 | 1 | 1 | 0 | 0 | 1 | 1 | 0 | 1 |
| 1 | 0 | 0 | 0 | 0 | 0 | 1 | 1 | 0 |
| 1 | 0 | 1 | 0 | 1 | 0 | 1 | 0 | 1 |
| 1 | 1 | 0 | 1 | 0 | 0 | 0 | 0 | 1 |
| 1 | 1 | 1 | 1 | 1 | 1 | 0 | 1 | 1 |

In formulating carry propagate logic, one must recognize that the critical path in any adder is along the carry chain. The most significant bit of the sum depends not only on the two most significant addend bits, but also the addend bits of every other bit position via the carry chain. Simply allowing carries to ripple from the least significant end would result in a compact but very slow adder, since the worst-case carry propagation delay would be approximately as many gate delays as the bit width of the adder.

Fast carry-propagate techniques can dramatically decrease the carry propagation delay, and therefore decrease the overall delay of the adder. Adders employing such techniques are sometimes referred to as carry-lookahead adders, or CLAs. Conventional carry propagate adder structures speed up the carry chain by computing the individual carry propagate (P) and carry generate (G) signals for each bit position. An example of an adder utilizing such carry-lookahead techniques is set forth in the 3-stage Adder Application.

For any two binary numbers A and B, the P and G signals for a given bit position, n, are:

$$P_n = A_n \oplus B_n \tag{3}$$

$$G_n = A_n B_n. \tag{4}$$

P and G may also be generated for 1-of-4 numbers. G indicates that the given dit position, n, generates a carry that must be accounted for in the higher dits of the sum. G will be set when the sum of two 1-of-4 numbers is greater than 3. P indicates that any carry generated in lower dits will propagate across the given dit position, n, to affect the higher dits of the sum. P will be set when the sum of two 1-of-4 numbers is exactly three. If neither G nor P is true for a given dit position, then a carry halt signal (H) is implied. An H signal indicates that any carry generated in lower dits will not propagate across the given bit position, n. H will be set if the sum of two 1-of-4 numbers is less than three. Restated, if the sum of two operand dits in a given dit position is greater than 3, G is true. If the sum is exactly 3, P is true. Otherwise, H is true.

Figure 7A:
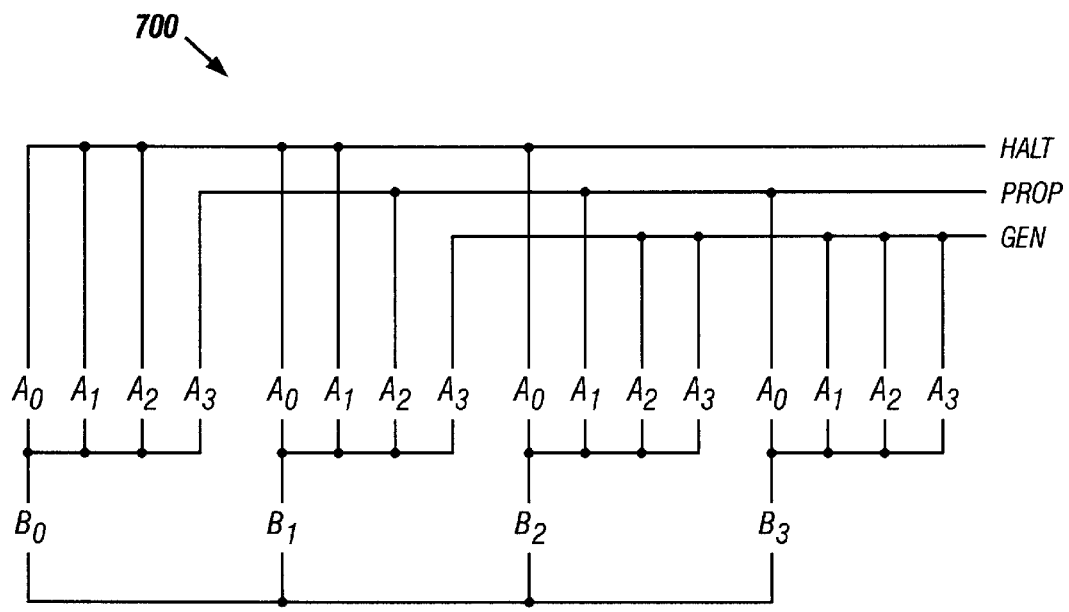
FIG. 7A is a shorthand representation of an N-nary HPG gate having two 1-of-4 inputs.
Figure 7B:
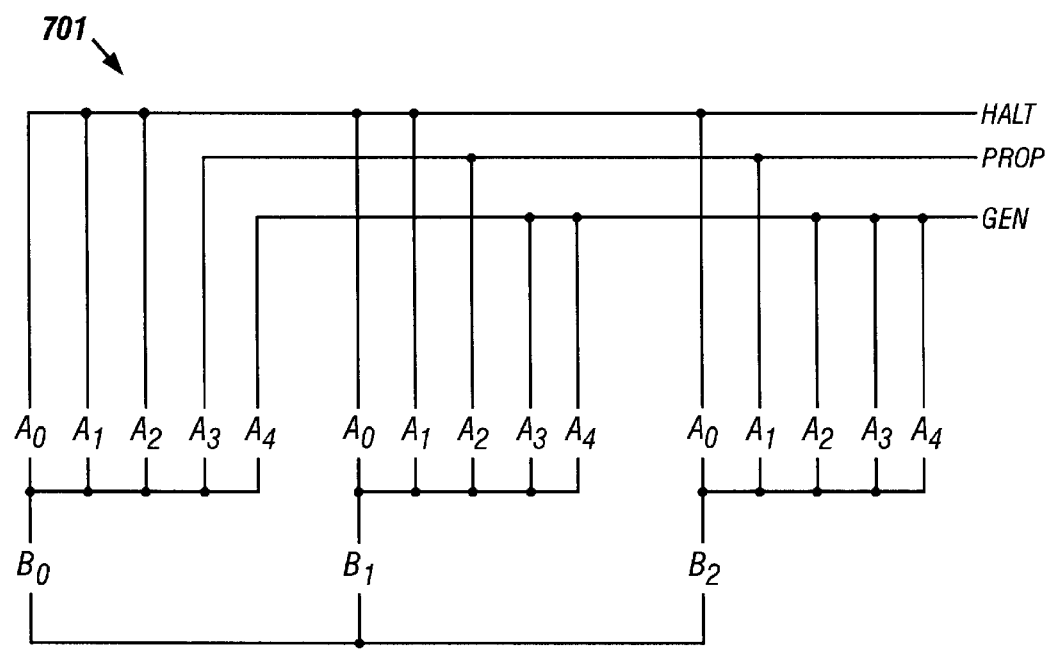
FIG. 7B is a shorthand representation of an N-nary HPG gate having one 1-of-3 input and one 1-of-5 input.

FIG. 7 illustrates an N-nary HPG gate 700 that utilizes carry propagate logic to generate an H, P, or G indication for two two-bit 1-of-4 addends. A similar function may be performed using one 1-of-3 addend and one 1-of-5 addend. Such a gate 701 is illustrated in FIG. 7A. The output of the FIG. 7 gate 700 is a 1-of-3 N-nary signal, such that one, and only one, of the H, P, or G wires is asserted during a given evaluate cycle. The output of the HPG gate 700 conforms to Table 5.

TABLE 5

| $A_3$ | $A_2$ | $A_1$ | $A_0$ | A Dec. Value | $B_3$ | $B_2$ | $B_1$ | $B_0$ | B Dec. Value | $P_n$ | $G_n$ | $H_n$ |
|---|---|---|---|---|---|---|---|---|---|---|---|---|
| 0 | 0 | 0 | 1 | 0 | 0 | 0 | 0 | 1 | 0 | 0 | 0 | 1 |
| 0 | 0 | 0 | 1 | 0 | 0 | 0 | 1 | 0 | 1 | 0 | 0 | 1 |
| 0 | 0 | 0 | 1 | 0 | 0 | 1 | 0 | 0 | 2 | 0 | 0 | 1 |
| 0 | 0 | 0 | 1 | 0 | 1 | 0 | 0 | 0 | 3 | 1 | 0 | 0 |
| 0 | 0 | 1 | 0 | 1 | 0 | 0 | 0 | 1 | 0 | 0 | 0 | 1 |
| 0 | 0 | 1 | 0 | 1 | 0 | 0 | 1 | 0 | 1 | 0 | 0 | 1 |
| 0 | 0 | 1 | 0 | 1 | 0 | 1 | 0 | 0 | 2 | 1 | 0 | 0 |
| 0 | 0 | 1 | 0 | 1 | 1 | 0 | 0 | 0 | 3 | 0 | 1 | 0 |
| 0 | 1 | 0 | 0 | 2 | 0 | 0 | 0 | 1 | 0 | 0 | 0 | 1 |
| 0 | 1 | 0 | 0 | 2 | 0 | 0 | 1 | 0 | 1 | 1 | 0 | 0 |
| 0 | 1 | 0 | 0 | 2 | 0 | 1 | 0 | 0 | 2 | 0 | 1 | 0 |
| 0 | 1 | 0 | 0 | 2 | 1 | 0 | 0 | 0 | 3 | 0 | 1 | 0 |
| 1 | 0 | 0 | 0 | 3 | 0 | 0 | 0 | 1 | 0 | 1 | 0 | 0 |
| 1 | 0 | 0 | 0 | 3 | 0 | 0 | 1 | 0 | 1 | 0 | 1 | 0 |
| 1 | 0 | 0 | 0 | 3 | 0 | 1 | 0 | 0 | 2 | 0 | 1 | 0 |
| 1 | 0 | 0 | 0 | 3 | 1 | 0 | 0 | 0 | 3 | 0 | 1 | 0 |

Preferred Embodiment of the Present Invention

Figure 22:
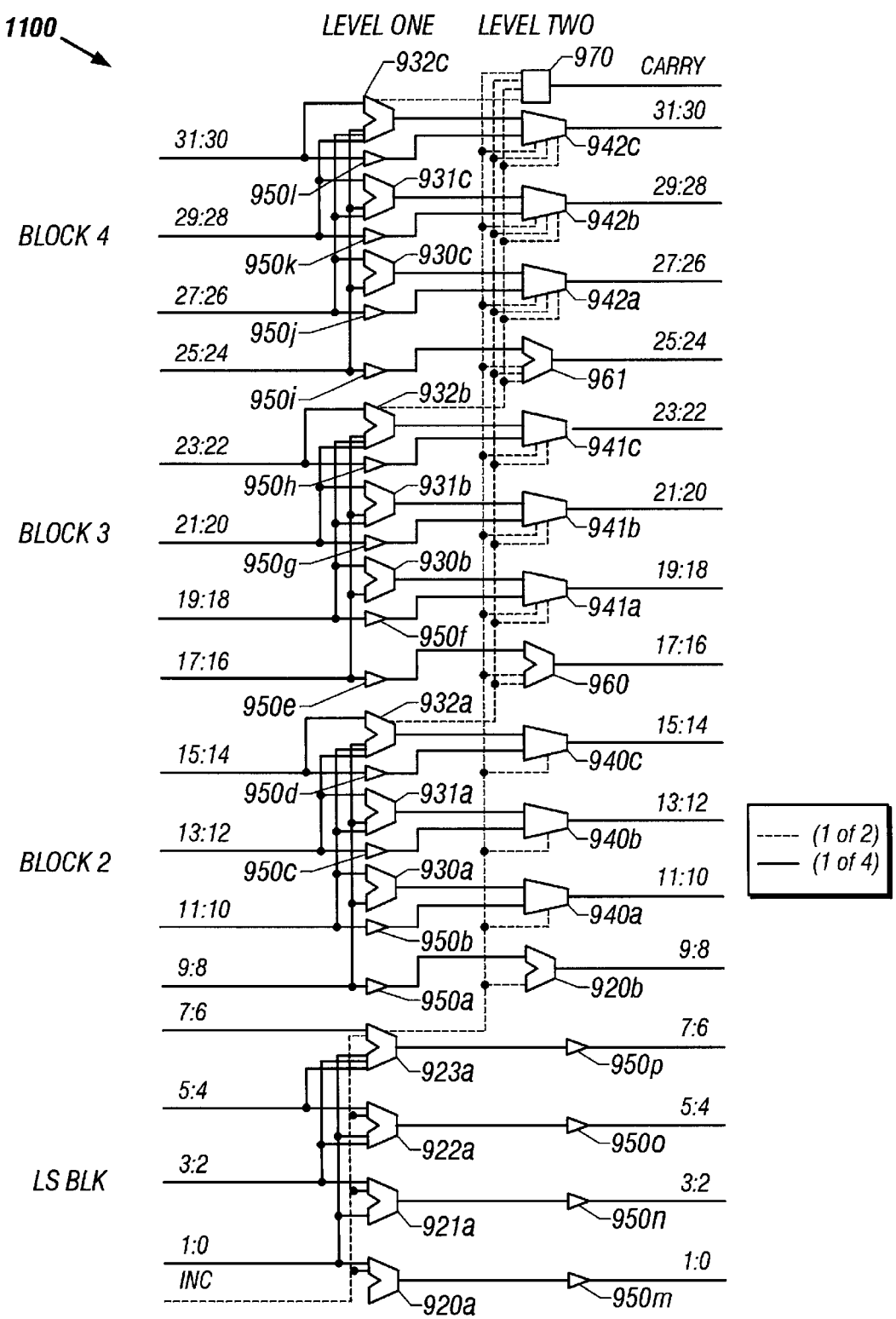
FIG. 22 is a schematic representation of the present invention.

The preferred embodiment of the present invention utilizes a subset of the carry propagate indicators discussed above. FIG. 22 illustrates that the incrementor 1100 of the present invention is constructed in two logic levels, Level One and Level Two. Each of the Levels conceptually may be further grouped into "blocks." Blocks represent: a) certain dits of the 32-bit 1-of-4 operand, and b) the logic gates of Levels One and Two associated with such dits. The least significant block, LSBlk, represents the four least significant dits of the operand, dits 0 through 3 (comprising bits 0 through 7), along with the Level One and Level Two logic gates associates with said dits. Similarly, Block Two represents dits 4 through 7 (bits 8 through 15) of the operand and also represents the Level One and Level Two logic gates associated with dits 4 through 7. By the same token, Block Three represents dits 8 through 11 (bits 16 through 23) and associated gates, and Block Four represents dits 12 through 15 (bits 24 through 31) and associated gates.

FIG. 22 illustrates that Level One of the present invention 1100 comprises a variety of gates that perform a variety of functions, including buffers 950, LSBlk incrementors 920, 921, 922, and 923, and higher block incrementors 930, 931, and 932. The increment control signal is a 1-of-2 signal having two wires, one wire being referred to herein as the increment select indicator ("inc") and the second being referred to herein as the increment deselect indicator ("$\overline{\text{inc}}$"). Level One incrementor gates 920, 921, 922, and 923 for the LSBlk differ slightly from Level One incrementor gates 930, 931, and 932 for the three higher blocks, since the increment control signal is an input only into LSBlk gates 920, 921, 922, and 923. In contrast, the increment control signal is not input into the higher block gates 930, 931, and 932, but rather its value is implicit in the block-propagate signal sent to higher blocks in Level Two.

Level One performs distinct increment processing for the LSBlk than it does for the higher blocks, Block 2, Block 3, and Block 4. For the LSBlk, Level One increments the value of each operand dit if 1) the increment select indicator, inc, is asserted, and 2) if all less significant dits within the block have propagated (i.e., have a value of three). Otherwise, the dits in the LSBlk are not incremented. In contrast, Level One always increments the value of each operand dit in the higher blocks, Block 2, Block 3, and Block 4, as long as all dits of lesser significance with the same block have propagated. For the higher blocks, Level One does not address the increment control indicator, or any other propagation indicator, but instead acts on the assumption that a propagation from lower block(s) will occur. The results of such "speculative" propagation are passed to the second level along with the unmodified operand bits, which are stored in buffers. In the second level, speculation about whether lower-order blocks have propagated a carry are resolved. If the necessary propagates did occur, then the speculative result is selected. Otherwise, the speculative result is invalid, and the unmodified bits are selected from the Level One buffers.

The present invention delivers, in addition to the incremented operand, a carry out indicator. The carry out indicator is a 1-of-2 signal, wherein one wire is the carry out indicator, Cout, and the other wire is the no carry indicator, $\overline{\text{Cout}}$. If all four blocks propagate the carry generated by the increment control signal input into the LSBlk, then a carry out indicator, Cout, is generated by the present invention. Otherwise, the no carry indicator, $\overline{\text{Cout}}$, is asserted.

Level One Buffers

Still referring to FIG. 22, Level One stores, unmodified, each dit of the higher blocks, Block 2, Block 3, and Block 4, in a buffer 950a through 950l. This preserves the unmodified operand dit values for use by Level Two in case a speculative propagate was not warranted.

Level One Incrementor Gates—LSBlk

Figure 9:
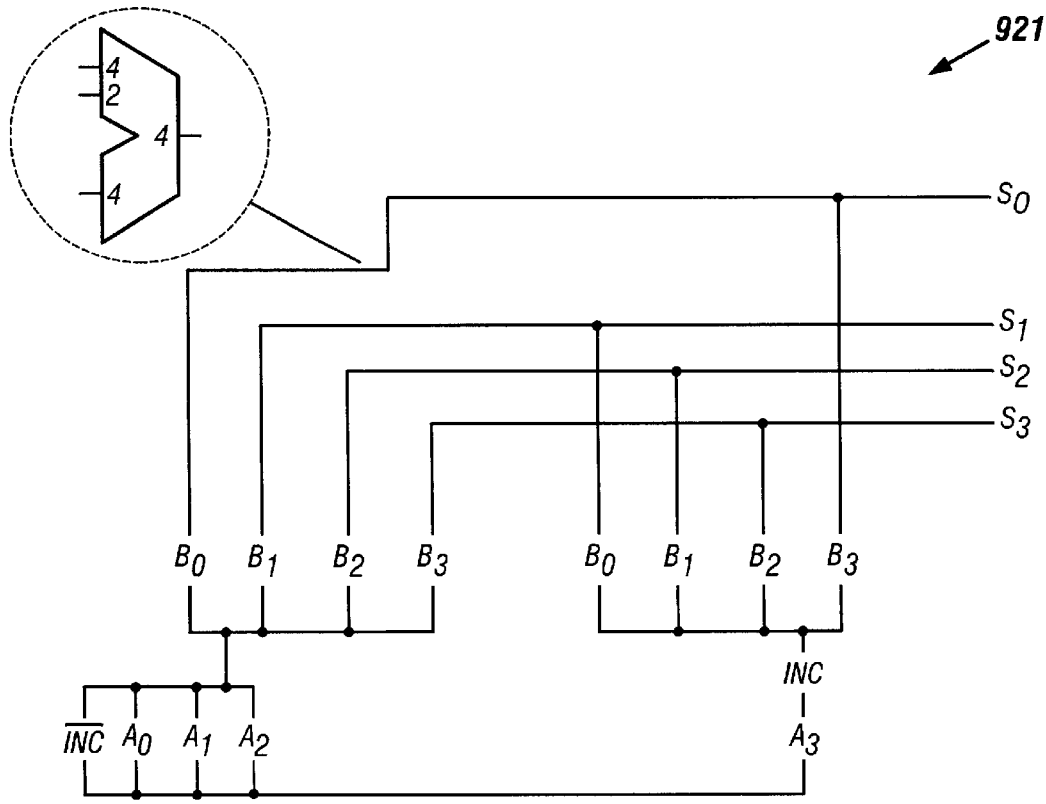
FIG. 9 is a shorthand representation of an N-nary LSBlK incrementor that takes the propagate condition of the immediately less significant dit into account.
Figure 10:
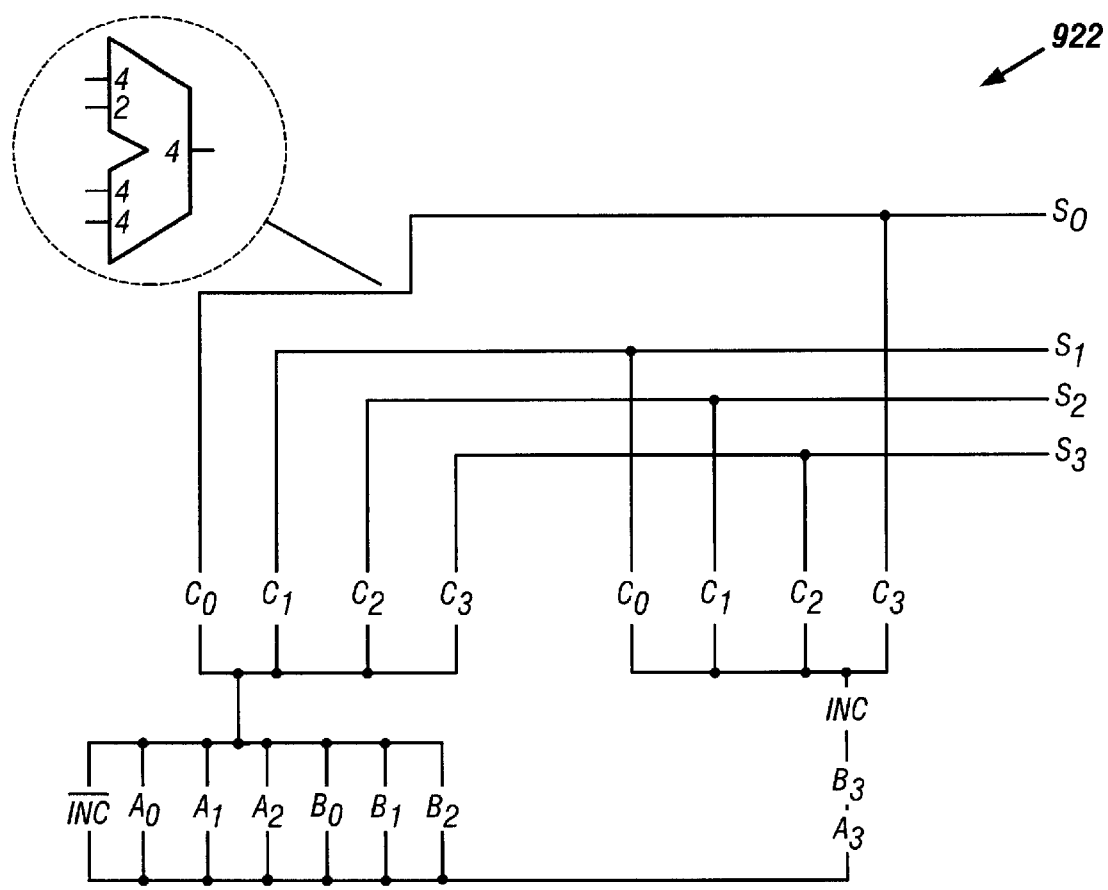
FIG. 10 is a shorthand representation of an N-nary LSBlk incrementor that takes the propagate condition of the two immediately less significant dits into account.

FIGS. 8. 9, and 10 illustrate the incrementor gates 920, 921, and 922 of the LSBlk. (A specialized LSBlk incrementor/prop gate for processing the most significant dit of the LSBlk is discussed separately below). Each of the Level One LSBlk incrementor gates 920, 921, 922 receives as inputs the increment control signal and at least one dit of the operand. FIG. 8 illustrates a gate 920 that receives one operand dit input, A. FIG. 9 illustrates a gate 921 that receives two operand dit inputs: the dit to be incremented, B, and the immediately less significant dit, A. FIG. 10 illustrates a gate 922 that receives three operand dit inputs: the dit to be incremented, C, and the two immediately less significant dits, B and A. For each of these gates 920, 921, and 922, the operation is simple. If an increment has been selected via the increment control signal, and if all intervening dits have propagated (i.e., have a value of three), one is added to the value of the operand dit. Otherwise, zero is added.

Level One Incrementor Gates—Higher Blocks

Figure 12:
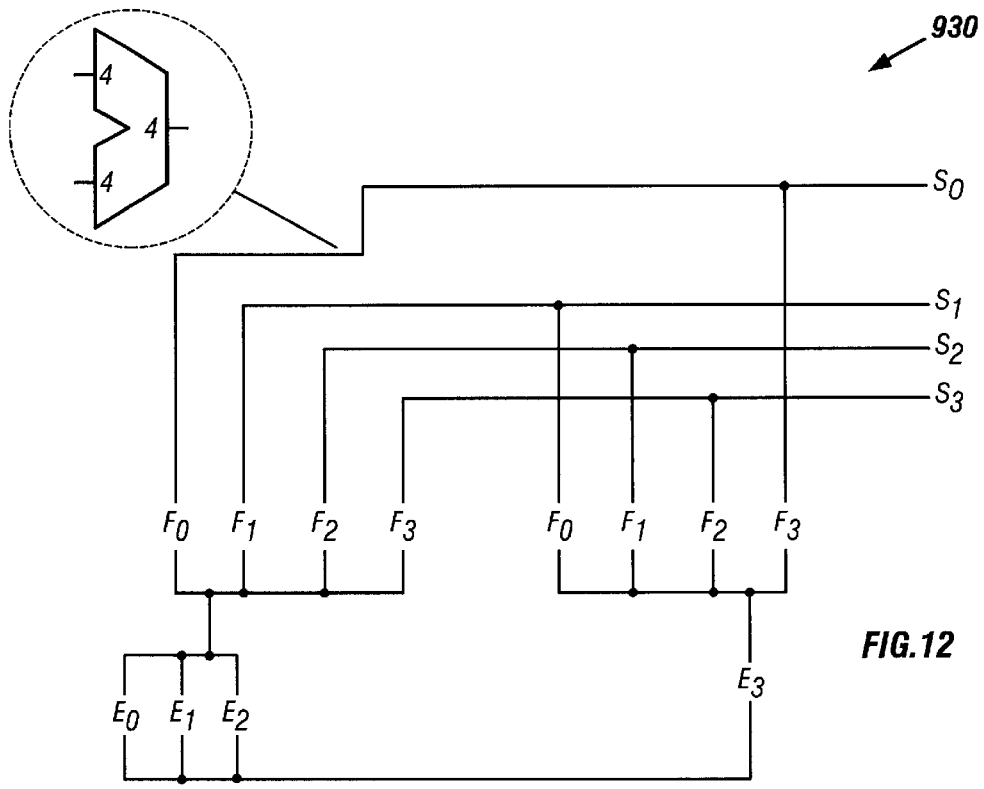
FIG. 12 is a shorthand representation of an N-nary higher block incrementor that takes the propagate condition of the immediately less significant dit into account.
Figure 13:
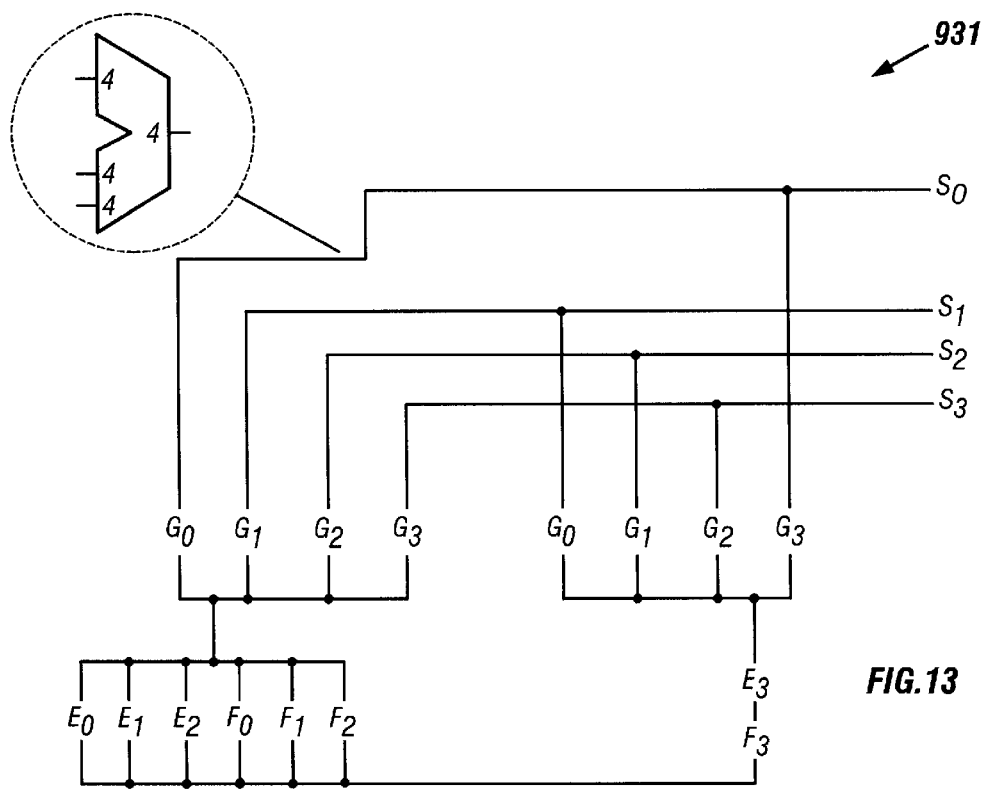
FIG. 13 is a shorthand representation of an N-nary higher block incrementor that takes the propagate condition of the two immediately less significant dits into account.

FIGS. 12 and 13 illustrate the Level One incrementor gates 930 and 931 for the higher blocks Block 2, Block 3, and Block 4. (A specialized incrementor/prop gate for processing the most significant dits of the higher blocks is discussed separately below). Gates 930 and 931 do not receive the increment control signal as an input. Instead, a speculative increment is performed on the three most significant dits of the operand within each of the higher blocks, as long as each less significant dit within the same block has propagated (i.e., has a value of three). It is assumed that a propagate from all less significant blocks has occurred. If this assumption is incorrect, it will be accounted for in Level Two.

FIG. 12 illustrates a gate 930 that receives as an inputs two dits of the operand: the dit to be incremented, F, and the immediately less significant dit, E. If the value of E is three, then the value of F is incremented by one. Otherwise, if the value of E is zero (E0), one (E1), or two (E2), then the value of F is not incremented but is merely passed through the gate 930.

FIG. 13 illustrates a gate 931 that receives as inputs three dits of the operand: the dit to be incremented, G, and the two immediately less significant dits, E and F. If the values of both E and F are three, then the value of G is incremented by one. Otherwise, the value of G is not incremented, but is merely passed through the gate 931.

It should be noted that the least significant dit of each of the higher blocks is not incremented at Level One. Instead, the values of such dits are merely stored by Level One in buffers 950*a*, 950*e*, and 950*i* for later use by Level Two.

Specialized Level One MSD Incrementor/Prop Gates

Figure 11:
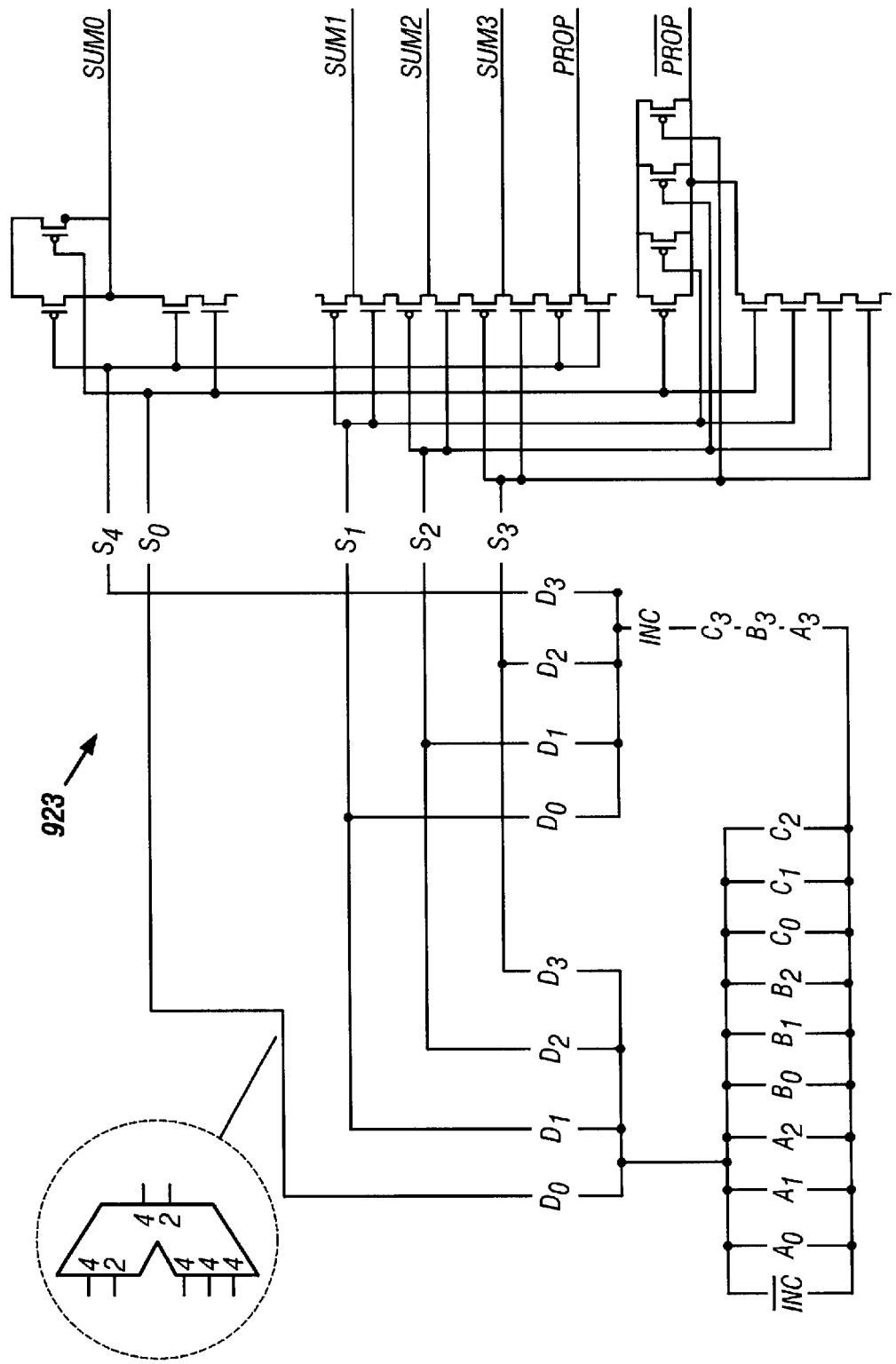
FIG. 11 is a modified shorthand representation of an N-nary LSBlk combined incrementor/prop gate.
Figure 14:
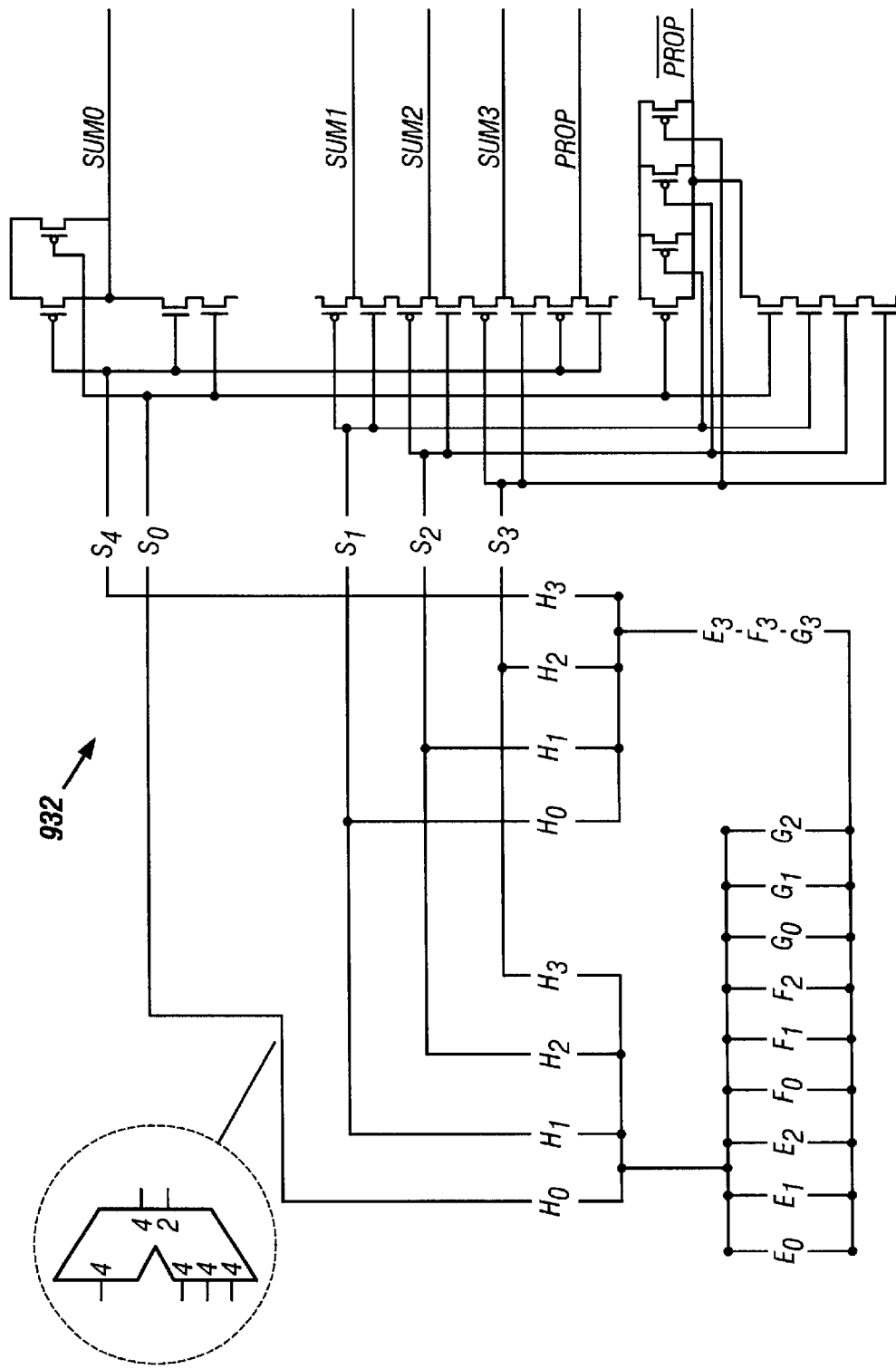
FIG. 14 is a modified shorthand representation of an N-nary higher block combined incrementor/prop gate.
Figure 15:
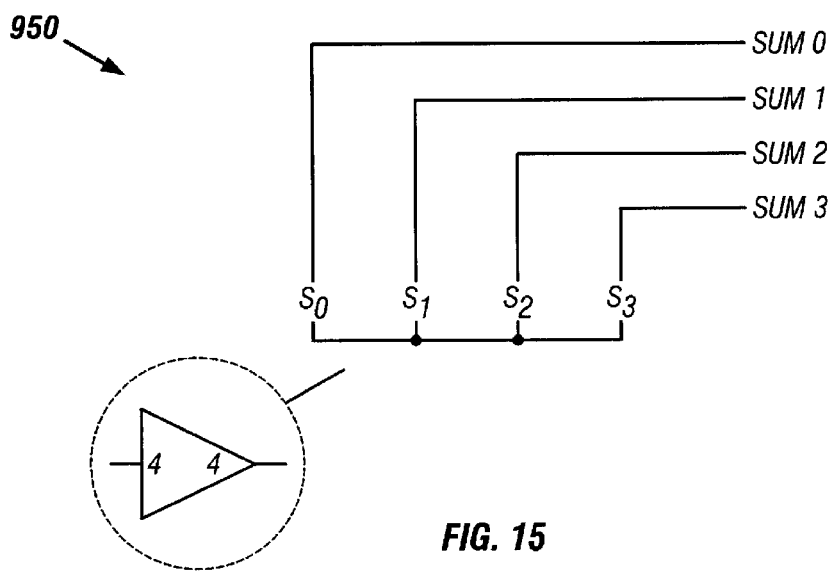
FIG. 15 is a shorthand representation of an N-nary sum buffer.

FIGS. 11 and 14 illustrate that the Level One incrementor gates that process the most significant dit of each block, i.e., gate 923 for the LSBlk and gate 932 for higher blocks, combine the incrementor function with modified carry propagate processing. The HPG logic performed by the Level One incrementor/HPG gates 923, 932 is slightly different from that performed by the HPG gate 700 illustrated in FIG. 7. The FIG. 7 gate 700 generates a 1-of-3 HPG signal in which the three wires represent halt, propagate, and generate indicators. In contrast, the Level One incrementor/prop gates 923, 932 of the present invention produce, rather than a 1-of-3 HPG indicator, only a 1-of-2 propagate signal wherein the two wires represent a propagate indicator, PROP, and a "no propagate" indicator, $\overline{PROP}$. This modified HPG functionality stems from the fact that, since there is only one operand into an incrementor gate, a carry generate cannot occur. The carry generated by the increment select signal, inc, will propagate across a given dit of the operand only if the value of that dit equals three (the usual propagate condition). Similarly, the carry generated by the increment select indicator, inc, will propagate across a block of dits only if all dits of the operand within that block equal three. Any other value implies a halt, or "no propagate" ($\overline{P}$), condition.

The incrementor/prop gates 923, 932 of the present invention combine the increment and carry propagate functions. As is discussed above, the LSBlk incrementor gates 920, 921, 922 will only increment if 1) the increment select indicator, inc, is asserted, and 2) all dits of lesser significance within LSBlk have propagated. The same is true for the increment function of gate 923. In contrast, the increment function of the increment/prop gate 932 for the higher blocks will be performed without regard to whether a carry has propagated across blocks of lower significance. Instead, gate 923 will increment its operand dit if all dits of lower significance within the block have propagated.

The function of the combined incrementor/prop gate 923 illustrated in FIG. 11 and the combined incrementor/prop gate 932 illustrated in FIG. 14 is to not only increment the operand, when necessary, but also to produce an indication of whether a carry has propagated across every dit within the block. In essence, these gates 923 and 932, being the gates for the most significant dit position within a block, assert block carry propagate indicators.

FIGS. 11 and 14 illustrate that it is not necessary to construct multiple identical output signals from an evaluate node, even though the combined incrementor/prop gates illustrated in FIGS. 11 and 14 comprises two output signals. In FIGS. 11 and 14, the evaluate nodes are identified as S0, S1, S2, S3, and S4. In order for the two different output signals, SUM and Prop, to conform to the 1-of-N signal definition, additional processing is performed on the evaluate nodes. In this processing, each evaluate node S0–S4 drives more than one output, and the outputs are different. FIGS. 11 and 14 illustrate that the PROP output is pulled high if the S4 evaluate node is asserted. For the $\overline{PROP}$ output, the S0, S1, S3, and S2 evaluate nodes are NAND'ed together. Because the evaluate nodes are asserted low and the outputs are asserted high, the effect of NANDing is to logically OR the evaluate terms.

Level Two

Level Two of the present invention is primarily concerned with three functions: 1) determining whether a speculative propagate at Level One was appropriate, 2) selecting the appropriate dit output value accordingly, and 3) generating a final carry out indicator. These functions are not, however, performed for the LSBlk. As stated above, the Level One processing for the LSBlk does not involve speculative propagation because the increment control signal is an input into the Level One LSBlk gates 920*a*, 921*a*, 922*a*, and 923*a*. The outputs of the Level One LSBlk gates 920*a*, 921*a*, 922*a*, and 923*a* are therefore merely stored in buffers 950*m*, 950*n*, 950*o*, 950*p* Level Two, since they already contain the appropriately incremented (or not) dit values. Also, the third Level Two function mentioned above, generating a final carry out indicator, is accomplished at Level Two through the use of the LSBlk block propagate indicator generated by gate 923*a* in Level One and therefore does not require any additional Level Two processing for the LSBlk, although Level Two gates for higher blocks do perform processing that takes such LSBlk block propagate signal into account in order to generate the carry out indicator.

FIG. 22 illustrates that the Level Two gates for the higher blocks comprise various logic gates that perform various functions. Each of the higher blocks Block 2, Block 3, and Block 4 contains one incrementor gate that processes the least significant dit of the block. Level Two also comprises, for each of the higher blocks, three speculation resolution gates. Finally, Block 4 comprises a specialized gate 970 that performs a carry out calculation for the incrementor. Each category of Level Two gates is described below.

Level Two Incrementor Gates

Level Two comprises, for the LSD of each of the higher blocks, a simple incrementor gate. For Block 2, this Level Two LSD incrementor gate 920*b* is illustrated in FIG. 8. FIG. 22 illustrates that the Level Two Block 2 LSD gate 920*b* takes as in inputs 1) the unmodified operand value for dit 4 (comprising bits 8 and 9 of the operand), which was placed in buffer 950*a* by Level One, and 2) the L,SBIk block propagate signal generated by gate 923*a* at Level One. FIG. 8 illustrates that, if the PROP wire for the 1-of-2 output of gate 923*a* (referred to as inc in FIG. 8) is asserted, then the Level Two Block 2 LSD incrementor gate 920*b* increments the value of operand dit 4. Otherwise, if the no propagate wire $\overline{PROP}$ (referred to as $\overline{inc}$ in FIG. 8) is asserted by gate 923*a* then the Level Two Block 2 LSD incrementor gate 920*b* does not increment.

Figure 16:
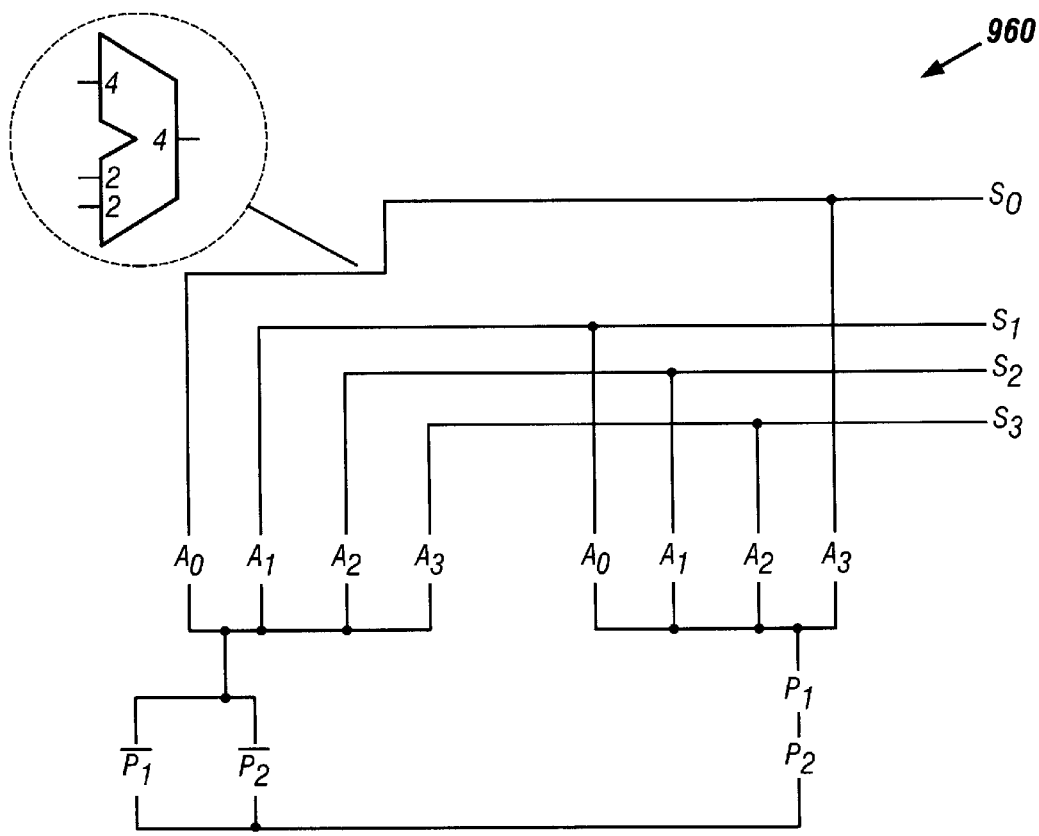
FIG. 16 is a shorthand representation of an N-nary Level Two, Block 3 LSD incrementor gate.

The Level Two LSD gate 960 for Block 3 performs processing similar to that performed by gate 920*b*, except that gate 960 receives two block propagate signals as inputs, along with the value of operand dit 8. FIG. 22 illustrates that gate 960 receives the unmodified value of operand dit 8 from Level One buffer 950*e*. FIG. 16 illustrates the operation of gate 960. Referring to FIG. 16, the block propagate signal from the LSBlk, generated by Level One gate 923*a*, is referred to as P1 and the Block 2 block propagate signal generated by Level One gate 932*a* is referred to as P2. If the propagate select wire for both P1 and P2 are asserted, the value of operand dit 8 is incremented. Otherwise, if either of the no propagate wires $\overline{P1}$ or $\overline{P2}$ are asserted then the gate 961 does not increment.

Figure 17:
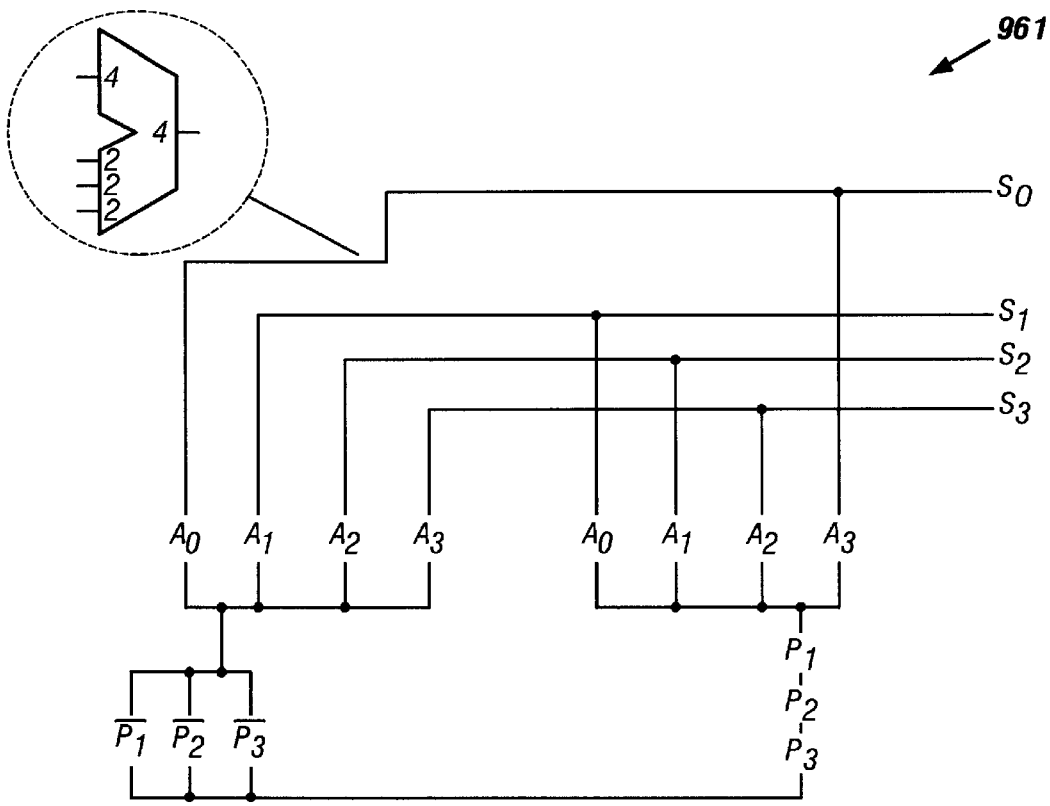
FIG. 17 is a shorthand representation of an N-nary Level Two, Block 4 LSD incrementor gate.

The Level Two LSD gate 961 for Block 4 performs processing similar to gates 920*b* and 960, except that gate 961 receives three block propagate signals as inputs, along with the unmodified value of operand dit 12. FIG. 22 illustrates that gate 961 receives the unmodified value of operand dit 12 from Level One buffer 950*i*. FIG. 17 illustrates the operation of gate 961. Referring to FIG. 17, the block propagate signal from the LSBlk, generated by Level One gate 923*a*, is referred to as P1. The Block 2 block propagate signal generated by Level One gate 932*a* is referred to as P2. The Block 3 block propagate signal generated by Level One gate 932*b* is referred to as P3. FIG. 17 illustrates that if the propagate select wires for P1, P2, and P3 are asserted, the value of operand dit 12 is incremented. Otherwise, if any of the no propagate wires $\overline{P1}$, $\overline{P2}$, or $\overline{P3}$ are asserted then the gate 961 does not increment.

Level Two Speculation Resolution Gates

FIG. 22 illustrates that each of the higher blocks, Block 2, Block3, and Block 4, comprises speculation resolution gates 940*a*, 940*b*, 940*c*, 941*a*, 941*b*, 941*c*, 941*a*, 942*b*, and 942*c*. The speculation resolution gates function to determine whether the incremented version or the unmodified version of an operand dit should be output from the incrementor. A slightly different speculation resolution gate is used by each of the higher blocks: gate 940 for Block 2, gate 941 for Block 3, and gate 942 for Block 4. Each of the higher blocks comprises three of its particular type of speculation resolution gate.

Figure 19:
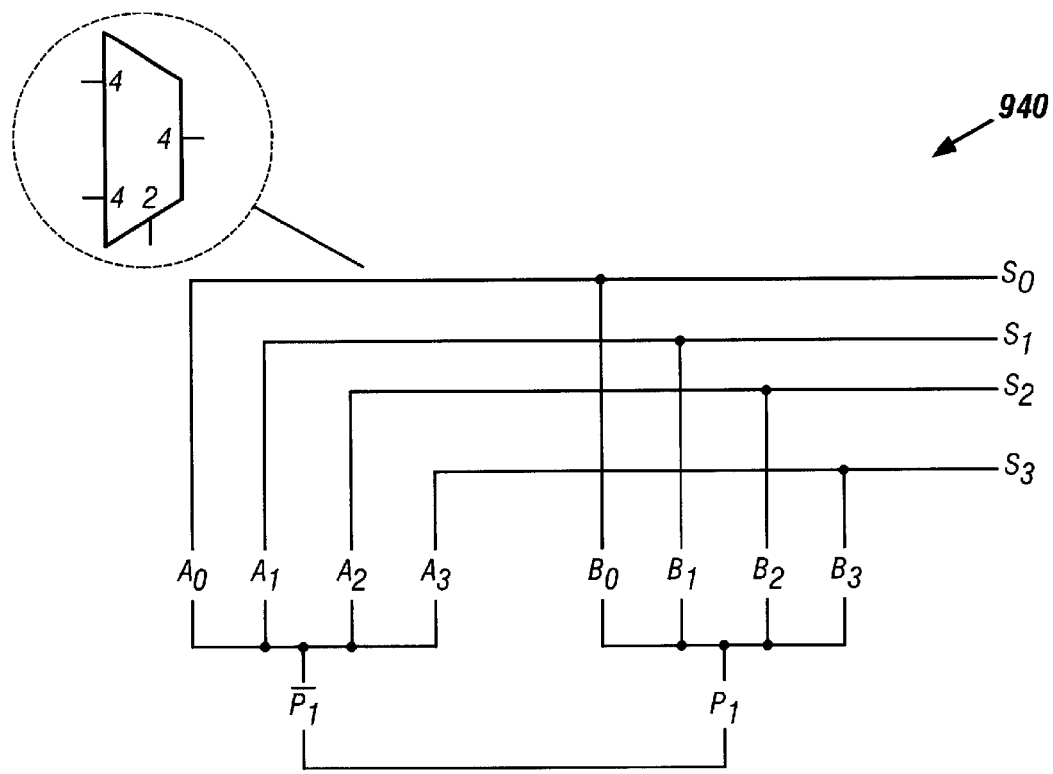
FIG. 19 is a shorthand representation of an N-nary Level Two speculation resolution gate that takes the block propagate signal of the immediately less significant block into account.

FIG. 19 sets forth an illustration of the Level Two speculation resolution gate 940 for Block 2. The Level Two Block 2 speculation resolution gate 940 receives two 1-of-4 addend dits as inputs. One input, referred to in FIG. 19 as A, is the unmodified operand dit that is stored in a buffer 950*b*, 950*c*, and 950*d* by Level One. (FIG. 22 illustrates the transfer of data from the buffers 950*a*, 950*b*, and 950*c* to the Level Two, Block 2 speculation resolution gates 940*a*, 940*b*, and 940*c*). The other input, referred to in FIG. 19 as B, is the incremented operand dit that is generated by the Level One Block 2 incrementor gates 930*a*, 931*a*, and 932*a*. (FIG. 22 illustrates the transfer of data from the Level One Block 2 incrementor gates 930*a*, 931*a*, and 932*a* to the Level Two, Block 2 speculation resolution gates 940*a*, 940*b*, and 940*c*). The Level Two Block 2 speculation resolution gate 940 also receives a 1-of-2 selection input, referred to in FIG. 19 as P1. P1 represents the Level One LSBlk block propagation signal generated by gate 923*a* in Level One. FIG. 19 illustrates that if the propagate select indicator is asserted for P1, then the incremented dit value, B, is output from the gate 940. Otherwise, the unmodified dit value, A, is output from the gate 940.

Figure 20:
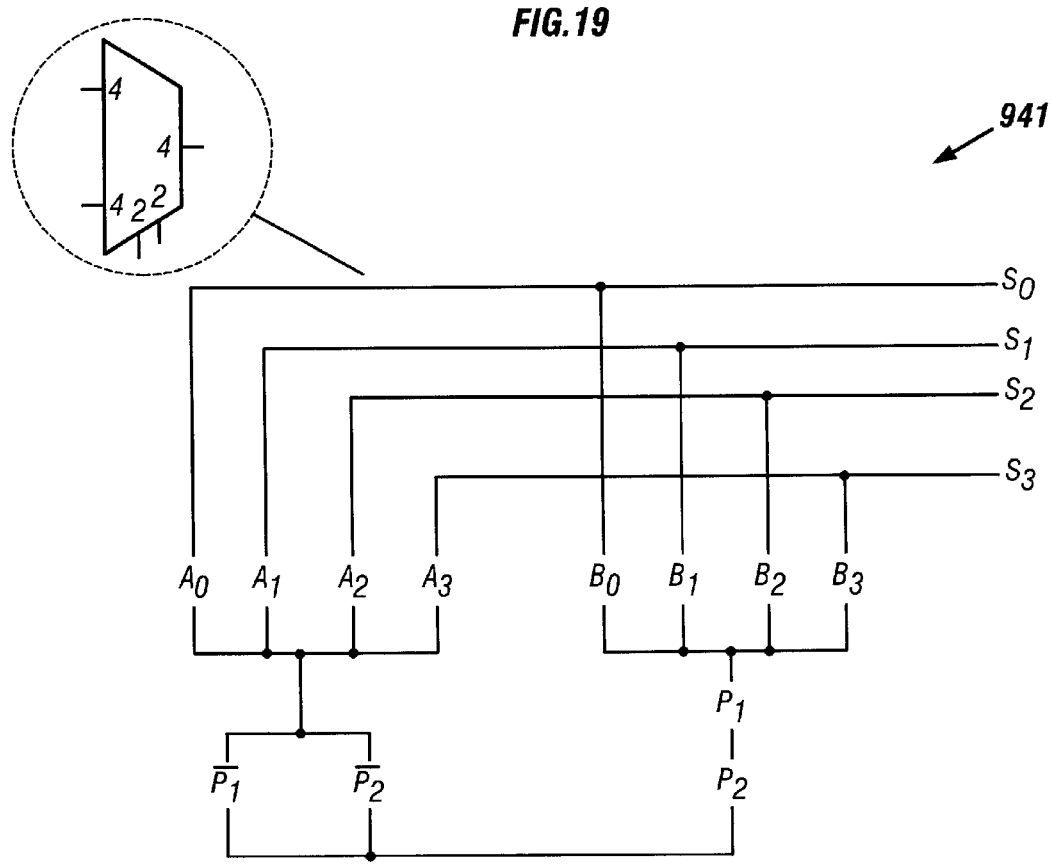
FIG. 20 is a shorthand representation of an N-nary Level Two speculation resolution gate that takes the block propagate signals of the two immediately less significant blocks into account.

FIG. 20 sets forth an illustration of the Level Two speculation resolution gate 941 for Block 3. The Level Two Block 3 speculation resolution gate 941 receives two 1-of-4 addend dits as inputs. One input, referred to in FIG. 20 as A, is the unmodified operand dit that is stored in a buffer 950*f*, 950*g*, and 950*h* by Level One. (FIG. 22 illustrates the transfer of data from the buffers 950*f*, 950*g*, and 950*h* to the Level Two, Block 3 speculation resolution gates 941*a*, 941*b*, and 941*c*). The other input, referred to in FIG. 20 as B, is the incremented operand dit that is generated by the Level One Block 3 incrementor gates 930*b*, 931*b*, and 932*b*. (FIG. 22 illustrates the transfer of data from the Level One Block 3 incrementor gates 930*b*, 931*b* and 932*b* to the Level Two, Block 3 speculation resolution gates 941*a*, 941*b*, and 941*c*). The Level Two Block 3 speculation resolution gate 941 also receives two 1-of-2 selection inputs. The first selection input, referred to in FIG. 20 as P1, is the Level One LSBlk block propagate signal generated by gate 923*a* in Level One. The other 1-of-2 selection input into gate 941, referred to in FIG. 20 as P2, is the Level One Block 2 block propagate signal generated by gate 932*a* in Level One. FIG. 20 illustrates that, if the propagate select indicator for both P1 and P2 is asserted, then the incremented dit value, B, is output from the gate 941. Otherwise, the unmodified dit value, A, is output from the gate 941.

Figure 21:
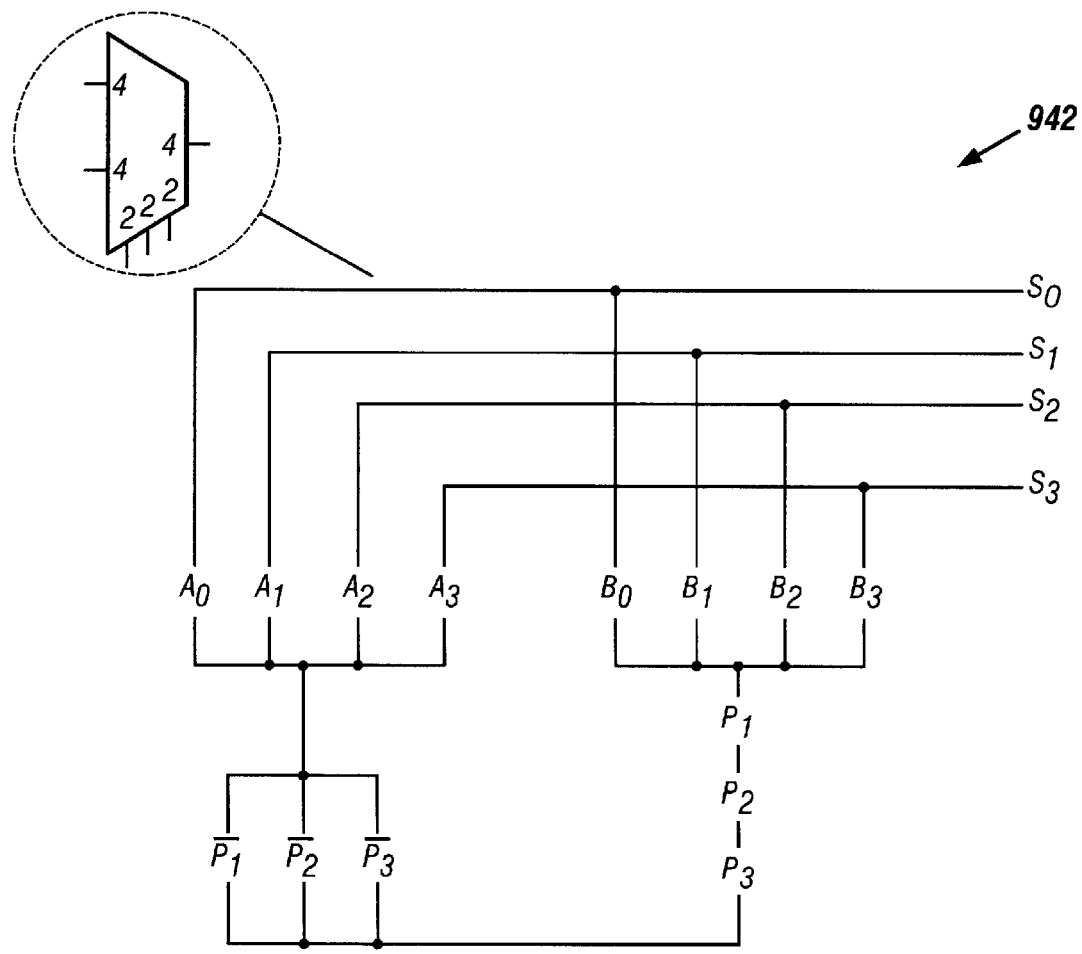
FIG. 21 is a shorthand representation of an N-nary Level Two speculation resolution gate that takes the block propagate signals of the three immediately less significant blocks into account.

FIG. 21 sets forth an illustration of the Level Two speculation resolution gate 942 for Block 4. The Level Two Block 4 speculation resolution gate 942 receives two 1-of-4 addend dits as inputs. One input, referred to in FIG. 21 as A, is the unmodified operand dit that is stored in a buffer 950*j*, 950*k*, and 950*l* by Level One. (FIG. 22 illustrates the transfer of data from the Level One Block 4 buffers 950*j*, 950*k*, and 950*l* to the Level Two, Block 4 speculation resolution gates 942*a*, 942*b*, and 942*c*). The other input, referred to in FIG. 21 as B, is the incremented operand dit that is generated by the Level One Block 4 incrementor gates 930*c*, 931*c*, and 932*c*. (FIG. 22 illustrates the transfer of data from the Level One Block 4 incrementor gates 930*c*, 931*c*, and 932*c* to the Level Two, Block 4 speculation resolution gates 942*a*, 942*b*, and 942*c*). The Level Two Block 4 speculation resolution gate 942 also receives three 1-of-2 selection inputs. The first selection input, referred to in FIG. 21 as P1, is the Level One LSBlk block propagate signal generated by gate 923*a* in Level One. The second 1-of-2 selection input into gate 942, referred to in FIG. 21 as P2, is the Level One Block 2 block propagate signal generated by gate 932*a* in Level One. The third 1-of-2 selection input into gate 942, referred to in FIG. 21 as P3, is the Level One Block 3 block propagate signal generated by gate 932*b* in Level One. FIG. 21 illustrates that, if the propagate indicators for P1, P2, and P3 are asserted, then the incremented dit value, B, is output from the gate 942. Otherwise, the unmodified dit value, A, is output from the gate 942.

Carry Gate

Figure 18:
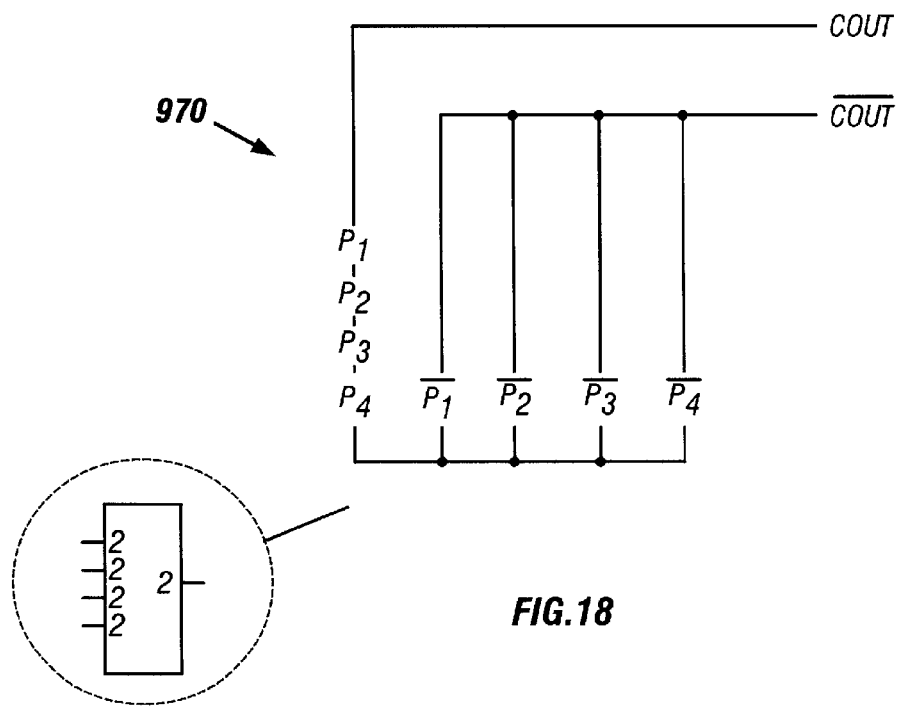
FIG. 18 is a shorthand representation of an N-nary carry gate.

FIG. 22 illustrates that the final (i.e., most significant) gate of Level Two is a carry gate 970. The carry gate 970 of the preferred embodiment of the present invention is illustrated in FIG. 18. The function of the carry gate 970 is to determine, when the increment select signal is asserted, whether the present invention generates a carry. FIG. 18 illustrates that the output of the carry gate 970 is a 1-of-2 carry out signal. One wire of the carry out signal is the carry out indicator, Cout, and the other wire is the no carry indicator, $\overline{\text{Cout}}$. FIG. 18 illustrates that the carry gate 970 receives four 1-of-2 signals as inputs. The first input, referred to in FIG. 18 as P1, is the Level One LSBlk block propagate signal generated by gate 923*a* in Level One. The second 1-of-2 input into gate 970, referred to in FIG. 18 as P2, is the Level One Block 2 block propagate signal generated by gate 932a in Level One. The third 1-of-2 input into gate 970, referred to in FIG. 18 as P3, is the Level One Block 3 block propagate signal generated by gate 932b in Level One. The fourth 1-of-2 input into gate 970, referred to in FIG. 18 as P4, is the Level One Block 4 block propagate signal generated by gate 932c in Level One. FIG. 18 illustrates that, if the increment select indicators for P1, P2, P3, and P4 are asserted, then the carry gate 970 generates a carry out indicator, Cout. The setting of the Cout indicator signifies that all four blocks, LSBlk, Block 2, Block 3, and Block 4, have propagated the carry generated by the increment control signal input into the LSBlk. Otherwise, if any of the no propagate indicators $\overline{P1}$, $\overline{P2}$, $\overline{P3}$, or $\overline{P4}$ is asserted, then the carry gate 970 generates a no carry indicator, $\overline{Cout}$.

In sum, the preferred embodiment of the present invention receives as inputs one 1-of-4 32-bit operand and a 1-of-2 increment control signal. For each dit of the operand, the present invention determines whether the increment control signal, which is treated as a carry into the least significant dit, propagates into said dit. If so, the dit is incremented. If not, the dit is output without modification. In addition to the 32-bit output operand, the present invention also generates a carry out signal if the increment control signal has propagated across all dits.

Other embodiments of the invention will be apparent to those skilled in the art after considering this specification or practicing the disclosed invention. The specification and examples above are exemplary only, with the true scope of the invention being indicated by the following claims.

We claim:

1. An apparatus that conditionally increments an operand, comprising:

an operand comprising a plurality of dits that comprise two bits and a plurality of blocks that comprise four dits, said plurality of blocks comprises a least significant block and one or more higher blocks;

an input 1-of-P increment selection signal, where P=2, that indicates whether said operand is to be incremented;

a plurality of input 1-of-N operand signals, where N=4, each said input 1-of-N operand signal represents the value of one dit of said operand;

a first N-NARY logic level that receives said input 1-of-P increment selection signal and said plurality of 1-of-N operand signals, said first N-NARY logic level increments the value of a first and second plurality of operand dits and determines whether incrementing said operand will cause a carry to propagate out of each one of said plurality of blocks; and a second N-NARY logic level that selects either the incremented value or the original value of said second plurality of operand dits and increments the value of a third plurality of operand dits if a carry propagates out of each block of lesser significance, said second level of logic produces a plurality of output 1-of-N result signals, where N=4, wherein each said output 1-of-N result signal represents the value of one dit of the result.

2. A system that conditionally increments an operand, comprising:

an operand comprising a plurality of dits that comprise two bits and a plurality of blocks that comprise four dits, said plurality of blocks comprises a least significant block and one or more higher blocks;

an input 1-of-P increment selection signal, where P=2, that indicates whether said operand is to be incremented;

a plurality of input 1-of-N operand signals, where N=4, each said input 1-of-N operand signal represents the value of one dit of said operand;

a first N-NARY logic level that receives said input 1-of-P increment selection signal and said plurality of 1-of-N operand signals, said first N-NARY logic level increments the value of a first and second plurality of operand dits and determines whether incrementing said operand will cause a carry to propagate out of each one of said plurality of blocks; and a second N-NARY logic level that selects either the incremented value or the original value of said second plurality of operand dits and increments the value of a third plurality of operand dits if a carry propagates out of each block of lesser significance, said second level of logic produces a plurality of output 1-of-N result signals, where N=4, wherein each said output 1-of-N result signal represents the value of one dit of the result.

3. A method that makes an apparatus that conditionally increments an operand, comprising:

providing an operand comprising a plurality of dits that comprise two bits and a plurality of blocks that comprise four dits, said plurality of blocks comprises a least significant block and one or more higher blocks;

providing an input 1-of-P increment selection signal, where P=2, that indicates whether said operand is to be incremented;

providing a plurality of input 1-of-N operand signals, where N=4, each said input 1-of-N operand signal represents the value of one dit of said operand;

providing a first N-NARY logic level that receives said input 1-of-P increment selection signal and said plurality of 1-of-N operand signals, said first N-NARY logic level increments the value of a first and second plurality of operand dits and determines whether incrementing said operand will cause a carry to propagate out of each one of said plurality of blocks;

providing a second N-NARY logic level coupled to said first N-NARY logic level, said second N-NARY logic level selects either the incremented value or the original value of said second plurality of operand dits and increments the value of a third plurality of operand dits if a carry propagates out of each block of lesser significance, said second N-NARY logic level produces a plurality of output 1-of-N result signals, where N=4, wherein each said output 1-of-N result signal represents the value of one dit of the result.

4. A method that conditionally increments an operand, comprising:

providing an operand comprising a plurality of dits that comprise two bits and a plurality of blocks that comprise four dits, said plurality of blocks comprises a least significant block and one or more higher blocks;

providing an input 1-of-P increment selection signal, where, P=2, that indicates whether said operand is to be incremented;

providing a plurality of input 1-of-N operand signals, where N=4, each said input 1-of-N operand signal represents the value of one dit of said operand;

receiving said input 1-of-P increment selection signal and said plurality of 1-of-N operand signals, incrementing the value of a first and second plurality of operand dits, and determining whether incrementing said operand will cause a carry to propagate out of each one of said plurality of blocks;

selecting either the incremented value or the original value of said second plurality of operand dits and incrementing the value of a third plurality of operand dits if a carry propagates out of each block of lesser significance; and producing a plurality of output 1-of-N result signals, where N=4, wherein each said output 1-of-N result signal represents the value of one dit of the result.

5. A dependent claim according to claim 1, 2, 3, or 4 wherein said first plurality of operand dits further comprises said least significant block and said first plurality of operand dits is incremented when the value of said input 1-of-P increment selection signal indicates that said operand is to be incremented.

6. A dependent claim according to claim 1, 2, 3, or 4 wherein said second plurality of operand dits further comprises the three most significant dits in each said higher block, and each said dit within said second plurality of dits is incremented if all lesser significant dits in the same block have a value of three.

* * * * *